(12) United States Patent
Marshall et al.

(10) Patent No.: US 7,264,546 B2
(45) Date of Patent: Sep. 4, 2007

(54) INTERACTIVE WAGERING SYSTEM WITH PROMOTIONS

(75) Inventors: Connie T Marshall, Muskogee, OK (US); Masood Garahi, Superior, CO (US); Jody M Brown, Brush, CO (US)

(73) Assignee: ODS Properties, Inc, Los Angeles, CA (US)

( * ) Notice: Subject to any disclaimer, the term of this patent is extended or adjusted under 35 U.S.C. 154(b) by 571 days.

(21) Appl. No.: 10/823,803

(22) Filed: Apr. 12, 2004

(65) Prior Publication Data

US 2004/0192435 A1 Sep. 30, 2004

Related U.S. Application Data

(62) Division of application No. 09/522,227, filed on Mar. 9, 2000, now Pat. No. 6,735,487.

(60) Provisional application No. 60/142,307, filed on Jul. 1, 1999.

(51) Int. Cl.
*A63F 9/24* (2006.01)
*G06F 17/00* (2006.01)

(52) U.S. Cl. .............................. 463/25; 463/40; 802/23; 725/10; 725/32; 725/34; 725/141; 379/93.13; 700/93

(58) Field of Classification Search ................ 463/1, 463/6, 25, 29, 40–43; 700/90–91; 725/86–87, 725/135, 139, 141, 9, 14–20, 25, 32, 34, 725/37–46, 58, 60–61
See application file for complete search history.

(56) References Cited

U.S. PATENT DOCUMENTS

| | | | |
|---|---|---|---|
| 3,909,002 A | 3/1975 | Levy | |
| 4,033,588 A | 7/1977 | Watts | |
| 4,108,361 A | 8/1978 | Krause | |
| 4,322,612 A | 3/1982 | Lange | |

(Continued)

FOREIGN PATENT DOCUMENTS

EP 0 387 046 A2 9/1990

(Continued)

OTHER PUBLICATIONS

"And We're Off To The Races!" John Burgess, The Washington Post, Jan. 16, 1995.

(Continued)

*Primary Examiner*—Mark Sager
(74) *Attorney, Agent, or Firm*—Fish & Neave IP Group of Ropes & Gray LLP; James A. Leiz; Brian E. Mack

(57) ABSTRACT

An interactive wagering system is provided that promotes wagering to users at user equipment. The user equipment may be based on a set-top box and television, a personal computer, a cellular telephone with a display, or other such devices. Wagering may be promoted by notifying the user of an opportunity to place a wager on a given race. Wagering may also be promoted by providing the user with an on-screen opportunity to sign up for a wagering television channel or interactive wagering service. The on-screen promotions that are displayed to the user may be targeted based on the television programming that is being displayed or the user's interests. The user's activities may be monitored to collect information on the user's interests. If a particular race or the like is being discussed during a television program, the user may be provided with an opportunity to wager on that race.

99 Claims, 9 Drawing Sheets

U.S. PATENT DOCUMENTS

| | | |
|---|---|---|
| 4,339,798 A | 7/1982 | Hedges et al. |
| 4,372,558 A | 2/1983 | Shimamoto et al. |
| 4,494,197 A | 1/1985 | Troy et al. |
| 4,593,904 A | 6/1986 | Graves |
| 4,636,951 A | 1/1987 | Harlick |
| 4,652,998 A | 3/1987 | Koza et al. |
| 4,689,742 A | 8/1987 | Troy et al. |
| 4,694,490 A | 9/1987 | Harvey et al. |
| 4,704,725 A | 11/1987 | Harvey et al. |
| 4,706,121 A | 11/1987 | Young |
| 4,745,468 A | 5/1988 | Von Kohorn |
| 4,747,600 A | 5/1988 | Richardson |
| 4,760,527 A | 7/1988 | Sidley |
| 4,764,666 A | 8/1988 | Bergeron |
| 4,799,683 A | 1/1989 | Bruner, Jr. |
| 4,815,741 A | 3/1989 | Small |
| 4,882,473 A | 11/1989 | Bergeron et al. |
| 4,922,522 A | 5/1990 | Scanlon |
| 4,926,255 A | 5/1990 | Von Kohorn |
| 4,926,327 A | 5/1990 | Sidley |
| 4,965,825 A | 10/1990 | Harvey et al. |
| 4,969,183 A | 11/1990 | Reese |
| 4,996,705 A | 2/1991 | Entenmann et al. |
| 5,007,649 A | 4/1991 | Richardson |
| 5,034,807 A | 7/1991 | Von Kohorn |
| 5,054,787 A | 10/1991 | Richardson |
| 5,057,915 A | 10/1991 | Von Kohorn |
| 5,083,271 A | 1/1992 | Thatcher et al. |
| 5,083,272 A | 1/1992 | Walker et al. |
| 5,083,800 A | 1/1992 | Lockton |
| 5,096,195 A | 3/1992 | Gimmon |
| 5,096,202 A | 3/1992 | Hesland |
| 5,112,050 A | 5/1992 | Koza et al. |
| 5,119,295 A | 6/1992 | Kapur |
| 5,178,389 A | 1/1993 | Bentley et al. |
| 5,186,471 A | 2/1993 | Vancraeynest |
| 5,218,631 A | 6/1993 | Katz |
| 5,223,924 A | 6/1993 | Strubbe |
| 5,227,874 A | 7/1993 | Von Kohorn |
| 5,233,654 A | 8/1993 | Harvey et al. |
| 5,249,044 A | 9/1993 | Von Kohorn |
| 5,276,312 A | 1/1994 | McCarthy |
| 5,280,426 A | 1/1994 | Edmonds |
| 5,282,620 A | 2/1994 | Keesee |
| 5,283,734 A | 2/1994 | Von Kohorn |
| 5,286,023 A | 2/1994 | Wood |
| 5,297,802 A | 3/1994 | Pocock et al. |
| 5,326,104 A | 7/1994 | Pease et al. |
| 5,327,485 A | 7/1994 | Leaden |
| 5,333,868 A | 8/1994 | Goldfarb |
| 5,340,119 A | 8/1994 | Goldfarb |
| 5,351,970 A | 10/1994 | Fioretti |
| 5,354,069 A | 10/1994 | Guttman et al. |
| 5,365,575 A | 11/1994 | Katz |
| 5,398,932 A | 3/1995 | Eberhardt et al. |
| 5,403,999 A | 4/1995 | Entenmann et al. |
| 5,408,417 A | 4/1995 | Wilder |
| 5,410,344 A | 4/1995 | Graves et al. |
| 5,411,258 A * | 5/1995 | Wilson et al. .................. 463/6 |
| 5,415,416 A | 5/1995 | Scagnelli et al. |
| 5,417,424 A | 5/1995 | Snowden et al. |
| 5,483,278 A | 1/1996 | Strubbe et al. |
| 5,505,449 A | 4/1996 | Eberhardt et al. |
| 5,507,489 A | 4/1996 | Reibel et al. |
| 5,518,253 A | 5/1996 | Pocock et al. |
| 5,526,035 A * | 6/1996 | Lappington et al. ........ 725/136 |
| 5,534,911 A | 7/1996 | Levitan et al. |
| 5,539,450 A | 7/1996 | Handelman |
| 5,539,822 A * | 7/1996 | Lett ........................... 380/211 |
| 5,545,088 A | 8/1996 | Kravitz et al. |
| 5,559,548 A | 9/1996 | Davis et al. |
| 5,559,549 A | 9/1996 | Hendricks et al. |
| 5,564,977 A | 10/1996 | Algie |
| 5,569,083 A | 10/1996 | Fioretti |
| 5,573,244 A | 11/1996 | Mindes |
| 5,575,474 A | 11/1996 | Rossides |
| 5,577,727 A | 11/1996 | Brame et al. |
| 5,586,937 A | 12/1996 | Menashe |
| 5,589,892 A | 12/1996 | Knee et al. |
| 5,600,364 A | 2/1997 | Hendricks et al. |
| 5,608,785 A | 3/1997 | Kasday |
| 5,643,088 A | 7/1997 | Vaughn et al. |
| 5,647,795 A | 7/1997 | Stanton |
| 5,679,077 A | 10/1997 | Pocock et al. |
| 5,683,090 A | 11/1997 | Zeile et al. |
| 5,688,174 A | 11/1997 | Kennedy |
| 5,713,795 A | 2/1998 | Kohorn |
| 5,722,890 A | 3/1998 | Libby et al. |
| 5,724,103 A | 3/1998 | Batchelor |
| 5,729,212 A | 3/1998 | Martin |
| 5,746,657 A | 5/1998 | Ueno |
| 5,749,785 A | 5/1998 | Rossides |
| 5,755,621 A | 5/1998 | Marks et al. |
| 5,759,101 A | 6/1998 | Von Kohorn |
| 5,762,552 A | 6/1998 | Vuong et al. |
| 5,772,511 A | 6/1998 | Smeltzer |
| 5,787,156 A | 7/1998 | Katz |
| 5,800,268 A | 9/1998 | Molnick |
| 5,816,817 A | 10/1998 | Tsang et al. |
| 5,816,919 A | 10/1998 | Scagnelli et al. |
| 5,823,879 A | 10/1998 | Goldberg et al. |
| 5,830,067 A | 11/1998 | Graves et al. |
| 5,830,068 A * | 11/1998 | Brenner et al. ................ 463/42 |
| 5,830,069 A | 11/1998 | Soltesz et al. |
| 5,851,149 A * | 12/1998 | Xidos et al. .................. 463/42 |
| 5,871,398 A | 2/1999 | Schneier et al. |
| 5,905,523 A * | 5/1999 | Woodfield et al. ............ 725/99 |
| 5,910,047 A | 6/1999 | Scagnelli et al. |
| 5,954,582 A | 9/1999 | Zach |
| 5,973,756 A * | 10/1999 | Erlin ........................ 348/734 |
| 5,999,808 A * | 12/1999 | LaDue .................... 455/412.2 |
| 6,001,016 A | 12/1999 | Walker et al. |
| 6,007,426 A | 12/1999 | Kelly et al. |
| 6,024,640 A | 2/2000 | Walker et al. |
| 6,024,641 A | 2/2000 | Sarno |
| 6,030,288 A | 2/2000 | Davis et al. |
| 6,080,062 A | 6/2000 | Olson |
| 6,080,063 A | 6/2000 | Khosla |
| 6,099,408 A | 8/2000 | Schneier et al. |
| 6,102,797 A | 8/2000 | Kail |
| 6,117,011 A | 9/2000 | Lvov |
| 6,117,013 A | 9/2000 | Eiba |
| 6,151,626 A * | 11/2000 | Tims et al. .................. 725/25 |
| 6,152,824 A | 11/2000 | Rothschild et al. |
| 6,186,892 B1 | 2/2001 | Frank et al. |
| 6,203,427 B1 | 3/2001 | Walker et al. |
| 6,251,016 B1 | 6/2001 | Tsuda et al. |
| 6,251,017 B1 | 6/2001 | Leason et al. |
| 6,254,480 B1 | 7/2001 | Zach |
| 6,257,982 B1 | 7/2001 | Rider et al. |
| 6,263,054 B1 | 7/2001 | Haefliger |
| 6,264,560 B1 | 7/2001 | Carlson |
| 6,273,820 B1 | 8/2001 | Haste, III |
| 6,280,328 B1 * | 8/2001 | Holch et al. .................. 463/42 |
| 6,287,199 B1 * | 9/2001 | McKeown et al. ........... 463/40 |
| 6,312,336 B1 * | 11/2001 | Handelman et al. .......... 463/40 |
| 6,450,887 B1 * | 9/2002 | Mir et al. .................... 463/42 |
| 2001/0003099 A1 | 6/2001 | Von Kohorn |
| 2001/0003100 A1 | 6/2001 | Yacenda |

FOREIGN PATENT DOCUMENTS

| | | |
|---|---|---|
| EP | 0 583 196 A1 | 2/1994 |
| EP | 0 620 688 A2 | 10/1994 |

| | | | |
|---|---|---|---|
| EP | 620688 A2 * | 10/1994 |
| EP | 0 624 039 A2 | 11/1994 |
| EP | 0 673 004 A2 | 9/1995 |
| EP | 0 873 772 A1 | 10/1998 |
| EP | 0 934 765 A1 | 8/1999 |
| GB | 2 300 535 A | 11/1996 |
| JP | 01-25659 | 1/1989 |
| JP | 01-269157 | 10/1989 |
| JP | 02-110660 | 4/1990 |
| JP | 02-231671 | 9/1990 |
| JP | 06-325062 | 11/1994 |
| WO | WO95/01058 | 1/1995 |
| WO | WO95/30944 | 11/1995 |
| WO | WO96/34491 | 10/1996 |
| WO | WO97/19428 | 5/1997 |
| WO | WO97/48230 | 12/1997 |
| WO | WO97/49242 | 12/1997 |
| WO | WO97482230 A1 * | 12/1997 |
| WO | WO98/26608 | 6/1998 |

OTHER PUBLICATIONS

"Interactive Wagering A Good Bet," Maury Wolff, Daily Racing Form, Jan. 29, 1995.

"New On TV: You Bet Your Horse," Ross Peddicord, The Sun, Baltimore, Maryland, Dec. 15, 1994.

"An Open-Systems Approach To Video On Demand," Yee-Hsiang Chang et al., IEEE Communications.

TrackMaster User's Guide Version 2.0.7, Apr. 1994, AXCIS Pocket Information Network, Inc., Santa Clara, California.

Tiny Tim Brochure, Auto Tote Systems, Inc., Newark, Delaware, undated.

Probe XL Brochure. Auto Tote Systems, Inc., Newark, Delaware, undated.

US 5,823,877, 10/1998, Scagnelli et al. (withdrawn)

* cited by examiner

INTERACTIVE WAGERING SYSTEM WITH PROMOTIONS

This is a divisional patent application of U.S. patent application Ser. No. 09/522,227, filed Mar. 9, 2000 now U.S. Pat. No. 6,735,487, which claims the benefit of U.S. provisional application No. 60/142,307, filed Jul. 1, 1999, which are hereby incorporated by reference herein in their entireties.

BACKGROUND OF THE INVENTION

This invention relates to interactive wagering systems and methods, and particularly to wagering systems and methods that allow users to place wagers on live wagering events, such as thoroughbred races, harness races, dog races, etc., at locations remote from the locations where the .wagering events take place, such as the users' homes. More particularly, this invention relates to wagering systems and methods that allow users to conveniently place wagers on live wagering events using wagering information that is provided with wagering-related video content.

Wagering on live events, such as thoroughbred races, harness races, dog races, etc., is an exciting and increasingly popular leisure activity. However, it is difficult or inconvenient for many racing enthusiasts to attend wagering events in person. Although off-track betting establishments provide greater access to wagering opportunities, they are still inconvenient because users must spend time locating and traveling to such establishments to place wagers.

The above-described difficulties that faced wagering enthusiasts were addressed in commonly-assigned U.S. Pat. No. 5,830,068 ("the '068 patent") of Brenner et al. entitled "Interactive Wagering Systems And Processes," which is hereby incorporated by reference herein in its entirety. The '068 patent discloses interactive wagering systems and processes that allow wagering enthusiasts to place wagers on live wagering events, such as horse races, from the convenience of their homes through the use of an in-home wagering terminal. The disclosed systems and processes give the users the opportunity to place wagers on live events being conducted at many different venues. In addition, the disclosed systems and processes provide the user with the opportunity to place many different types of wagers, ranging from the simple to the very complex, through an intuitive, on-screen interface. Information that may assist the users in making wagering decisions, such as odds, weather, track conditions, and handicapping data, is also provided through the on-screen interface.

More recently, ODS Technologies, L.P. announced the launch of the TVG Network—a television channel dedicated to delivering programming relating to horse racing. In addition to live coverage of racing events, the TVG Network may broadcast profiles, reviews and/or feature presentations that relate to certain horses, jockeys, trainers, owners, tracks, racing events, etc. Many TVG Network viewers may, as a result of watching the broadcast, become interested in placing a wager based on the subject matter of the broadcast. However, unless specifically mentioned in the broadcast, the viewers may not know when a wagering opportunity relating to the subject matter of the broadcast will be available, if at all. Even if the wagering opportunity is mentioned, the users would have to pay close attention to gather the information they would need to place a wager.

Moreover, users who are watching programming other television channels may not even be made aware of the availability of the interactive wagering service or of the TVG Network wagering television channel.

It is therefore an object of the present invention to provide improved ways in which to promote wagering services such as interactive wagering and wagering television channels.

It is also an object of the present invention to provide improved ways to bring interactive wagering opportunities to the attention of television viewers.

SUMMARY OF THE INVENTION

These and other objects of the invention are provided in accordance with the principles of the present invention by providing systems and methods that alert users who are watching a television channel of the presence of an interactive wagering service. Users may also be provided with an opportunity to sign up for the interactive wagering service. Promotional material may be displayed to provide users with information on a wagering television channel that the users may sign up for. Systems and methods may also be provided that provide a user with immediate notification of a wagering opportunity relating to a broadcast, and that simplify the process of placing a wager based on the broadcast. The broadcast may be a wagering television channel broadcast or a conventional television channel broadcast.

Users may be alerted to the presence of an interactive wagering service using a pop-up ticker or other notification that appears as an overlay on top of the video for the currently-displayed television channel. Such a pop-up ticker may be displayed at any suitable time. For example, the pop-up ticker may be displayed whenever the user is watching horse-racing related television. The pop-up ticker may also be displayed when the user is watching television programming related to other subjects or is watching any other television programming. If desired, such a pop-up ticker may be used to promote the wagering television channel.

Wagering information may be provided to a user terminal in connection with wagering-related television broadcasts. This information may be provided using any suitable technique, such as by embedding the information in a broadcast signal or otherwise providing the information in association with a broadcast signal, providing the information as part of a television program guide database, providing the information in a continuous data stream not associated with any particular broadcast signal, providing the information on demand by the user, or providing the information periodically (e.g., once per day or once per hour, etc.)

Broadcast wagering information and other such wagering information may be used to link the broadcast to an interactive wagering interface provided by the user terminal, such as the wagering interface disclosed in the '068 patent. Any known arrangement for providing the wagering information with the television broadcast may be used. For example, the wagering information can be embedded in unused portions of the broadcast signal, such as the horizontal or vertical blanking intervals. Alternatively, the wagering information may be provided in separate signal, such as an FM subcarrier or in a separate digital data stream. The manner by which the wagering information relating to the television broadcast is provided may be selected in part on the particular hardware platform on which the wagering interface is implemented.

When the user terminal receives wagering information relating to a broadcast, the interactive wagering application that supports the interactive wagering service or other suitable application may display a visual indication on the user's display to notify the user that there is a wagering opportunity available relating to the broadcast the user is watching. The visual indication may be, for example, a small icon generated by the interactive wagering application that is displayed as an overlay on top of a wagering-related broadcast.

In one embodiment, a non-interactive icon is displayed that simply serves as notification that the user may use the interactive wagering service to place a wager relating to the broadcast. For example, if a particular horse is being discussed on the wagering-related broadcast channel, the icon may be displayed to notify the user that there is an opportunity to place a wager on the horse being discussed. Upon seeing the icon, the user can invoke the wagering application to place a wager on that horse.

In another embodiment of the invention, the displayed icon may be interactive, and may be selected by the user using any type of suitable user input device, such as a remote control unit or a keyboard. The interactive wagering interface may respond to the user's selection of the displayed icon in various ways, depending on the level of sophistication desired. In one embodiment, the user's selection of the displayed icon causes the user terminal to invoke the interactive wagering interface, and then allows the user to navigate through the available menus to place a wager, if desired. For example, when the icon is selected, the user terminal may display a main menu screen of the interactive wagering service. From there, the user can use the wagering service menu system to place a wager relating to the subject matter of the wagering-related television broadcast.

The wagering information included with the wagering-related broadcast may streamline the user's wagering experience by allowing the wagering application to bypass some of the menus that would otherwise be provided to the user. Specifically, in addition to providing an indication of a wagering opportunity, the transmitted wagering information may include more detailed information about the wagering opportunity that can be used in place of user responses to menu prompts in the wagering application. For example, if the wagering-related broadcast is discussing a particular horse, the wagering information can include a racetrack identification, a race identification, and a horse identification. If the user selects the interactive icon, the wagering application may use that information to bypass the menus that would otherwise be displayed to allow the user to select a racetrack, race, and horse. The first menu presented to the user may be, for example, a menu that allows the user to select a wager type and amount for the identified racetrack, race, and horse. The data supplied by the broadcast wagering information may be clearly displayed to the user to ensure the user fully appreciates what it is he or she is in the process of wagering on.

The initial menu displayed to the user may be based on the type of information included in the broadcast wagering information. For example, if the wagering information only identifies a racetrack (if, for example, the wagering-related broadcast is profiling a particular racetrack), then the wagering application may display a menu of races being run at that track.

Although the wagering application may direct the user to a particular menu, the user would be able to navigate to other menus as well, including those that may have been bypassed. The user can return to the wagering-related broadcast at any time (e.g., by pressing a designated key on the user input device).

In an alternative embodiment of the invention, the broadcast wagering information may be used in connection with a modified wagering application that displays a small overlay on the wagering-related broadcast. The overlay allows the user to continue to watch the broadcast while considering possible wagering opportunities. The overlay may be displayed automatically when the broadcast wagering information indicates that there is a wagering opportunity. Alternatively, the overlay may be displayed in response to the user's selection of the interactive icon discussed above. Scaled video can be used as an alternative to an overlay (depending on the hardware platform) to avoid obscuring the underlying video content.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
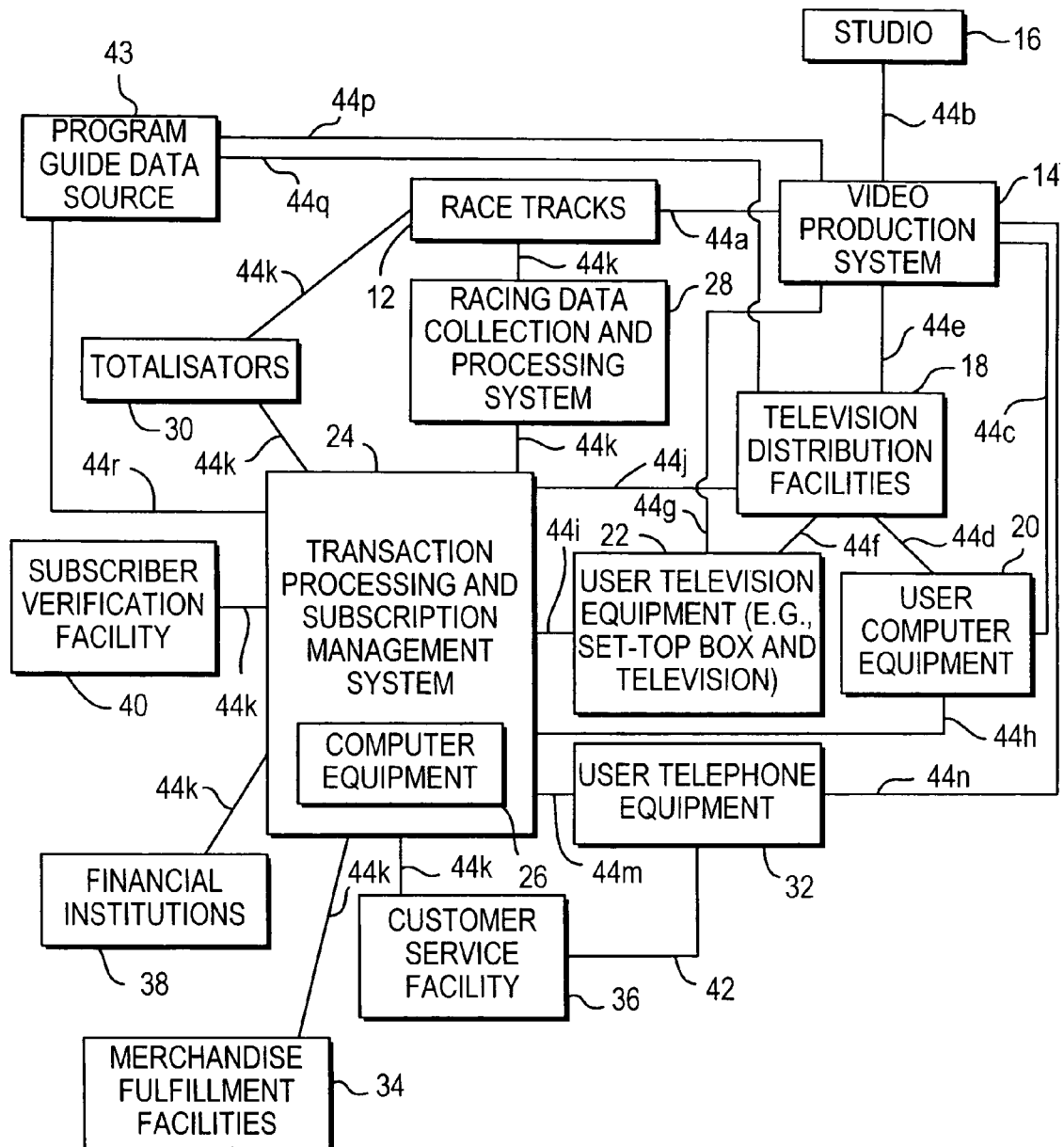
FIG. 1 is a schematic diagram of an illustrative interactive wagering system in accordance with the present invention.

An illustrative interactive wagering system 10 in accordance with the present invention is shown in FIG. 1. Aspects of the invention apply to various different types of wagering, but are described herein primarily in the context of interactive wagering on races (e.g., horse races) for specificity and clarity.

Races may be run at racetracks 12, which may be located at various geographic locations. Races run at the racetracks may be simulcast to television viewers. For example, simulcast videos may be provided to users with satellite receivers or to off-track betting establishments via satellite.

System 10 may be used to provide an interactive wagering service to users of various user equipment. An interactive wagering application may be used to provide the wagering service. The interactive wagering application may run locally on the user equipment (e.g., on a set-top box, personal computer, cellular telephone, handheld computing device, etc.) or may run using a client-server or distributed architecture where some of the application is implemented locally on the user equipment in the form of a client process and some of the application is implemented at a remote location (e.g., on a server computer or other such equipment in the system) as a server process. These arrangements are merely illustrative. Other suitable techniques for implementing the interactive wagering application may be used if desired.

Real-time videos from racetracks 12 may also be provided to video production system 14 for distribution to users as part of a television wagering service (i.e., a wagering television channel or similar Internet-delivered service or the like). If desired, multiple simulcast videos may be provided to video production system 14 in real-time. Talent (e.g., commentators who discuss horse races) for the television wagering service provided by the interactive wagering application may be located at studio 16. Studio 16 may provide a video feed containing commentary and the like to video production system 14. Graphic overlays for the television wagering service may be added to the service at video production system 14.

The television wagering service may use video production system 14 to combine selected video segments from desired racing simulcasts with the video feed from studio 16 and suitable graphic overlays. If desired, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, etc.

Video production system 14 may be used to provide a television wagering service that includes selected simulcast videos, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 16 may be any suitable facilities for supplying television to users, such as cable system headends, satellite systems, broadcast television systems, or other suitable systems or combinations of such systems. User computer equipment 20 may be any suitable computer equipment that supports an interactive wagering application. For example, user computer equipment 20 may be a personal computer. User computer equipment 20 may also be based on a mainframe computer, a workstation, a networked computer or computers, a laptop computer, a notebook computer, a handheld computing device such as a personal digital assistant or other small portable computer, etc.

Each of television distribution facilities 18 is typically located at a different geographic location. Users with user television equipment 22 may receive the television wagering service from an associated television distribution facility. User television equipment 22 may include, for example, a television or other suitable monitor. A television may be used to watch the television wagering service on a traditional analog television channel. User television equipment 22 may also include a digital or analog set-top box connected to a television distribution facility 16 by a cable path. A digital set-top box may be used to receive the television wagering service on a digital channel. If desired, user television equipment 22 may contain a satellite receiver, a WebTV box, a personal computer television (PC/TV), or hardware similar to such devices into which set-top box capabilities have been integrated. A recording device such as a videocassette recorder or digital recording device (e.g., a personal video recorder or digital video recorder based on hard disk drives or the like) may be used in user television equipment 22 to store videos. The recording device may be separate from or part of the other components of user television equipment 22.

User computer equipment 20 may receive the television wagering service using a video card or other video-capable equipment to receive analog or digital (e.g., moving picture experts group or MPEG) videos from a television distribution facility. User computer equipment 20 may also receive the television wagering service directly from video production system 14 using, for example, a modem link. If desired, the video for the television wagering service may be compressed (e.g., using MPEG techniques). This may be useful, for example, if the path to user computer equipment 20 is a modem connection using telephone links. If video production system 14 is only used to serve user computer equipment 20 without traditional analog television capabilities, video production system 14 may only need to supply such digitally-compressed video signals and not analog television signals.

Video clips of races and other simulcast information may be provided to users in the form of a television wagering service or by an interactive wagering service provided by the interactive wagering application. If desired, race-related videos may be provided to the user by using video production system 14 or other suitable equipment to route appropriate video clips from the simulcasts to the user in real time. Video clips may also be stored for later viewing. For example, one or more video servers located at racetracks 12, video production system 14, television distribution facilities 18, or other suitable locations may be used to store video clips. The stored videos may then be played back in real time or downloaded for viewing at user television equipment 22, user computer equipment 20, or user telephone equipment 32. The video clips may contain videos of races, commentary, interviews with jockeys, or any other suitable race-related information. If desired, real-time or stored videos may be provided from racetracks 12 directly to user television equipment 22, user computer equipment 20, or user telephone equipment 32 over the Internet or other suitable communications paths without involving video production system 14. Videos may also be provided by routing video signals through equipment located elsewhere in system 10. For example, videos may be routed through transaction processing and subscription management system 24.

Transaction processing and subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, etc.), data distribution (e.g., for distributing racing data to the users), and subscriber management (e.g., features related to opening an account for a user, closing an accounts allowing a user to add or withdraw funds from an account, changing the user's address or personal identification number, etc.). Databases within transaction processing and subscription management system 24 or associated with system 24 may be used to store racing data, wagering data and other transaction data, and subscriber data such as such as information on the user's current account balance, past wagering history, individual wager limits, personal identification number, billing addresses, credit card numbers, bank account numbers, social security numbers, etc. Using such databases may allow the user to access information more quickly and allows for central administration of the wagering service.

If desired, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, handicapping information (e.g., information on past performances such as the number of wins and losses for the past year, etc.), and weather conditions at various tracks may be provided by racing data collection and processing system 28. Some of the data may be collected from racetracks 12 and some may be provided by third party information sources such as Axcis Pocket Information Network, Inc. of Santa Clara, Calif. or other suitable data sources.

Racing data may also be provided from totalisators 30. Totalisators 30 are the computer systems that may be used to handle wagers made at the racetracks, made at off-track betting establishments, and made using interactive wagering system 10. Totalisators 30 generate wagering odds in real time. Totalisators 30 generate these odds based on information on which wagers are being placed (e.g., based on information on which wagers are being placed on races at racetracks 12). Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators 30 may provide racing data including information on the current races at racetracks 12, the number of races associated with each racetrack, win, place, and show odds and pool totals for each horse or other runner, and exacta, trifecta, and quinella payoff predictions and pool totals for every possible combination of runners. Totalisators 30 may also provide current odds and other real-time racing data for other types of wagers. Totalisators 30 may provide the time until post time for each race.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list.

Totalisators 30 may also provide program information of the type typically provided in printed racing programs. Such program information may include early odds, early scratches, race descriptions (including the distance of each race and the race surface—grass, dirt, artificial turf, etc.), allowed class ratings (based on a fixed ratio of external criteria), purse value (payoff to winning runner), allowed age range of runners, and the allowed number of wins and starts for each runner.

If desired, some of the information provided to transaction processing and subscription management system 24 by totalisators 30 (such as the program information or other suitable racing data) may be provided by racing data collection and processing system 28. Similarly, some of the information provided to transaction processing and subscription management system 24 by racing data collection and processing system 28 may be provided by totalisators 30.

Moreover, the foregoing examples of different suitable types of racing data are merely illustrative. Any suitable data related to racing may be provided to transaction processing and subscription management system if desired.

Transaction processing and subscription management system 24 provides the racing data to users at user television equipment 22, user computer equipment 20, and user telephone equipment 32 for use in following race results and developing wagers. If desired, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones with displays. Users may view racing data displayed on such displays.

Users who wish to place wagers may establish an account at transaction processing and subscription management system 24. An account may also be established at one of totalisators 30. The user and the interactive wagering services may have their own bank accounts at financial institutions 38. A user may set up an account electronically by using user television equipment 22, user computer equipment 20, or user telephone equipment 32 to interact with the subscriber management functions of transaction processing and subscription management system 24. If desired, accounts may be established with the interactive wagering service with the assistance of customer service representatives at customer service facility 36. Customer service facility 36 may be at the same location as transaction processing and subscription management system 24, may be part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the service, a telephone at the same location as that equipment may be used to reach the customer service representative.

The user's identity may be checked using social security number information or other identification information with the assistance of subscriber verification facility 40. The services of subscriber verification facility 40 are used to ensure that the user lives in a geographic area in which wagering is legal, that the user is of a legal age, and that the identification information (e.g., the user's social security number) matches the name provided by the user. If the user is using a cellular telephone or handheld computing device, the user's present physical location may be determined by determining which general part of the cellular telephone network is being accessed by the user or by using the cellular network or a handset-based location device such as a global positioning system (GPS) receiver in the body of the cellular telephone to pinpoint the user's location. This location information may be used to verify that the user is located in a geographic area where wagering is legal.

In a typical enrollment process, the user provides personal information to the interactive wagering service and provides funds with a credit card or funds from the user's bank account. The interactive wagering service sets up an account for the user at transaction processing and subscription management system 24 and directs one of totalisators 30 to set up a new account for the user at the totalisator. The totalisator is also directed to credit the user's account to reflect the amount of funds provided by the user. After the user places a wager and wins or loses, the totalisator adjusts the user's totalisator account to reflect the outcome of the wager. The totalisator may periodically inform the interactive wagering service of the adjusted balance in the user's account. This may be accomplished using any suitable technique (e.g., periodically, continuously, on-request, etc.). For example, reports may be collected periodically (e.g., once a day in an end-of-day report) and provided to the interactive wagering service to reconcile the account balances at transaction processing and subscription management system 24 with the account balances at totalisators 30.

If the user makes a balance inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 are typically maintained separately, because the business entities that operate totalisators 30 and transaction processing and subscription management system 24 are independent. If desired, financial functions related to opening and maintaining user accounts and the like may be handled using computer equipment at another location such as one of financial institutions 38 or other location remote from totalisators 30 and system 24. Such financial functions may also be implemented primarily at a totalisator 30 or primarily at the transaction processing and subscription management system 24 if desired.

Users at user television equipment 22, user computer equipment 20, and user telephone equipment 32 may place wagers by providing wagering data and otherwise interacting with transaction processing and subscription management system 24. The interactive wagering service may provide a user at user television equipment 22, user computer equipment 20, or user telephone equipment 32 that has display capabilities with screens containing various racing data. For example, the user may be presented with screens that allow the user to view the current odds for horses in an upcoming race at a given track.

The service may provide the user with interactive screens containing menus and selectable options that allow the user to specify the type of wager in which the user is interested and the desired wager amount. With a set-top box arrangement, for example, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. When the user has made appropriate selections to define a desired wager, the user television equipment, user computer equipment, or user telephone equipment may transmit wagering data for the wager to transaction processing and subscription management system 24.

Users with telephones may also interact with the service using an interactive voice response system located at transaction processing and subscription management system 24. The interactive voice response system may present menu options to the user in the form of audio prompts (e.g., "press 1 to select a $2 wager amount," etc.). The user may interact with the service be pressing the corresponding buttons on a touch tone telephone. User telephone equipment 32 that is based on cellular telephones allows the user to interact with the wagering service in this way. User telephone equipment 32 that is based on cellular telephones with messaging and display capabilities also allows the user to interact visually with the interactive wagering service.

The television wagering service or wagering television channel that is provided by video production system 14 may often contain programming that discusses a particular racetrack. The programming may also discuss a particular race or races at this racetrack. The names of various horses may be discussed in connection with the discussion of the racetrack and race. This wagering information may be provided to the wagering application or other suitable application at user television equipment 22, user computer equipment 20, and user telephone equipment 32 in real time or in advance, so that the user may be provided with notifications or promotions that encourage the user to sign up for the wagering television channel and interactive wagering service and that encourage the user to place wagers. If the information on the content of the programming on the wagering television channel at a particular point in time is known far enough in advance, this information may be provided in the form of wagering schedule data.

Wagering schedule data may be provided to the wagering application or other suitable application in advance. A data source may be used to distribute the wagering schedule data to the application. If desired, the data source that is used to provide the wagering schedule data to the user may also be used to distribute program guide data to the user for use in an interactive television program guide.

An illustrative program guide data source 43 is shown in FIG. 1. Program guide data source 43 may be used to provide wagering television channel schedule data and schedule data for other television channels to the equipment of the user. An interactive television program guide application may use the schedule data to display program listings information for the user in various display formats. For example, the user may direct the program guide to display program titles in a grid format organized by time and channel. Program titles may also be displayed in lists organized by time or by channel.

The program guide may display program listings on user television equipment 22, user computer equipment 20, or a cellular telephone with a display. The program guide may allow the user to set reminders for programs of interest, establish favorite programs and channels, and set parental controls based on ratings information. The program guide may also allow the user to order pay-per-view programming, view interactive advertisements, order products, and perform other suitable functions. Data for the program guide that may be provided by program guide data source 43 may include data such as program titles, scheduled broadcast times, channels, content ratings (G, TV-Y, PG, etc.), star ratings (i.e., review-based ratings), pricing information for pay-per-view programs, program descriptions, information on actors, running times, directors, category or genre classifications, etc. This data may contain information (e.g., genre information or title or description information or special additional information) that indicates whether certain television programming is related to horse racing, wagering, racing, sports, equine themes, etc.

Wagering information on the racetracks, races, and horses that are discussed on the wagering television channel that is provided by video production system 14 may be provided from video production system 14 or other such facility directly to user television equipment 22, user computer equipment 20, or user telephone equipment 32. Such wagering information may also be provided from video production system 14 to program guide data source 43.

Wagering information on the racetracks, races, and horses that are discussed on the wagering television channel and other information on the programming on the wagering television channel may be provided, e.g., to the program guide for use in displaying a schedule of the programming that is scheduled to appear on the wagering television channel. In client-server-based program guides, the program guide data that is provided by program guide data source 43 may be stored on server processors (e.g., servers located at television distribution facilities 18 that may be accessed by user television equipment 22 or user computer equipment 20 or servers that may be accessed by computer equipment 20 or user telephone equipment 32 over the Internet or other suitable communications paths). In locally-based program guides, a program guide database may be maintained at the user equipment (e.g., in memory in a set-top box that is part of user television equipment 22).

Regardless of where the program guide data from program guide data source 43 is maintained, the program guide data may be used by both the program guide and the interactive wagering application. The interactive wagering application may use wagering schedule information that is provided as part of the program guide data to determine when certain television channels are broadcasting content that might appeal to horse-racing fans. The interactive wagering application or other suitable application may analyze the program guide data to determine, for example, whether certain television programming is horse-related, racing-related, sports-related or wagering-related.

Information on whether a program is sports-related may, for example, be gathered from the category or genre information that is used by the program guide to identify certain programs as "sports" programs. Information on whether a program is horse-related may be determined from a title or description search (e.g., looking for the word "horse") or may be based on a list of known horse-related programs (e.g., National Velvet) hat is supplied to the wagering application. Information on whether a program is racing-related or wagering-related may similarly be based on a keyword match in the title or description or may be based on a match between the program title and a list of known programs of these types. Lists of titles may be provided to the wagering application from program guide data source 43, transaction processing and subscription management system 24, or other suitable equipment such as a server or servers or other computer equipment. If desired, information such as genre, title, and description information may be provided using data sources that operate independently from any program guide data source. These examples are merely illustrative. The nature of the television programming being provided to the user (e.g., at user television equipment 22) may be determined using any suitable approach.

The components of system 10 may be interconnected using various communications paths 44. Communications paths 44 may include satellite paths, coaxial cable paths, fiber-optic paths, twisted pair paths, other wire or cable-based links, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval of a television channel or on a television sideband, MPEG transmissions etc. Communications may involve wireless pager or other messaging transmissions. Communications paths 44 may include cable connected to cable modems, digital subscriber lines, integrated services digital network (ISDN) lines, or any other suitable paths. Examples of suitable communications paths are described below. Those examples are, however, merely illustrative. Any of the communications path arrangements described above or other suitable arrangements may be used if desired.

Communications paths that carry video and particularly uncompressed analog video or lightly-compressed or full-screen digital video generally use more bandwidth than communications paths that carry only data or that carry partial-screen digital video. For example, if it is desired to transmit high-quality simulcasts of races from racetracks 12 to video production system 14, analog or digital videos may be transmitted from racetracks 12 to video production system 14 over path 44a using satellite links. Video may be transmitted from studio 16 to video production system 14 over path 44b using a satellite link or a high-speed terrestrial path such as a fiber-optic path. Studio 16 may also be located at the same site as video production system 14, thereby avoiding the need for a long-haul transmission path. Videos may be transmitted from video production system 14 to user computer equipment 20 over path 14c using a modem link (using, for example, a digital subscriber line, a telephone network link, a wireless link etc.) The modem link may be made over a private network.

A user with a cable modem may connect a personal computer or other such user computer equipment 20 to an associated cable system headend using path 44d. (The headend in such an arrangement would be one of the television distribution facilities 18 shown in FIG. 1.) The user may then receive videos from the headend via cable modem. Videos may be provided to the headend over path 44e using a network link, fiber optic links, cable links, microwave links, satellite links, etc. A user with a set-top box (shown in FIG. 1 as part of user television equipment 22) or similar device may also receive videos from a cable system headend using a cable modem or other such communications device over path 44f. In addition, a user with user television equipment 22 may receive videos over the Internet or a private network using a telephone-based modem or other such communications device using path 44g. In a system with distributed processing, interactive wagering services may be provided using a television distribution facility 18 that includes equipment that supplements or replaces at least some of the equipment at transaction processing and subscription management system 24.

If desired, user television equipment 22 or user computer equipment 20 may receive analog or digital videos from an associated television distribution facility over the communications paths normally used to distribute television programming (e.g., paths 44f and 44d). For example, videos may be received as part of a wagering television channel. If videos are provided as digital signals (e.g., MPEG signals), 10 or more digital videos may be carried on a single analog channel (or one digital video may be carried on one-tenth of the bandwidth of an analog channel). If the videos are not full-screen videos, even more videos may be simultaneously provided without a loss of image quality.

Racing videos may be provided to user telephone equipment 32 over a partially-wireless telephone Internet link or other telephone link using path 44n.

If desired, racing data may accompany the racing videos along any of these paths. Moreover, racing videos may be provided by routing them directly from racetracks 12 to user television equipment 22, user computer equipment 20 (e.g., over the Internet or a private network, etc.), or user telephone equipment 32. Racing videos may also be provided by routing them through transaction processing and subscription management system 24. If a cellular telephone or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, etc. Racing videos may be provided in real time or may be recorded for later distribution. Videos that are not provided in real-time may be downloaded by user television equipment 22, user computer equipment 20, a cellular telephone, or other suitable user equipment at a lower data rate than would otherwise be required and may be downloaded in the background if desired. Such videos may also be provided to the user at real-time video rates for direct viewing by the user.

Racing data and other information related to the interactive wagering service may be provided to users over paths connected to transaction processing and subscription management system 24. For example, racing data and other data for the service may be provided to user computer equipment 20 over path 44h using a modem link. Path 44h may be a private network path or an Internet path. Path 44h may use telephone lines, digital subscriber lines, ISDN lines, wireless data paths, or any other suitable type of communications links. User television equipment 22 may receive data for the wagering service over communications path 44i, which may be a telephone line, digital subscriber line, ISDN line, or other suitable type of communications path and which may use a private network path or an Internet path, etc.

Data for the wagering service may be provided to users of the interactive wagering application via communications path 44j and paths 44f and 44d. Communications path 44j may be provided over a private network, using the public telephone network, using satellite links, or any other suitable type of links. Data from paths such as path 44j may be routed to paths such as paths 44f and 44d directly by associated television distribution facilities 18, or may be buffered at television distribution facilities 18 if desired. Paths 44f and 44d may include coaxial cable and use of paths 44f and 44d may involve the use of cable modems or the like. If data is provided over path 44j and path 44f or path 44d using an Internet protocol, a web browser or similar software running on user television equipment 22 or user computer equipment 20 may be used to access the data. Such software may be integrated into the interactive wagering application or may be used separately. Software may also be used to view videos and may be used on other platforms (e.g., advanced cellular telephones) if desired.

The communications paths 44k that are used to connect various other components of the system typically do not carry high-bandwidth video signals. Accordingly, paths 44k may be telephone-like paths that are part of the Internet or a private network. Such paths and various other paths 44 may be dedicated connections for security, reliability, and economy.

User telephone equipment 32 may receive information for the wagering service via path 44m. If user telephone equipment 32 is a standard (non-cellular) telephone, such information may be in the form of audio prompts ("press 1 to place a wager") and audio racing data ("the current win odds for horse 2 are 5-1"). Transaction data processing and subscription management system 24 may contain interactive voice response equipment that provides such information to the user and that responds to touch-tone signals from the user when the user responds to prompts by pressing buttons on the user's telephone.

If user telephone equipment is a cellular telephone, racing data and other information for the interactive wagering service may be provided to the user by using a cellular wireless connection as part of path 44m. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. If desired, data may be provided to the cellular telephones over the voice channel and decoded by the cellular telephone using modem circuitry or other suitable circuitry. Data may also be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location. Videos may also be provided using any of these techniques.

A return communications path between the user and the interactive wagering service may be used to allow the user to place wagers and otherwise interact with the interactive wagering service. For example, a user with a standard telephone or a cellular telephone may interact with the service by pressing touch-tone keys on the telephone in response to audio prompts provided by an interactive voice response system at transaction processing and subscription management system 24. If desired, users may call customer service representatives at customer service facility 36 and place wagers with manual assistance. The user of a cellular telephone may interact with the wagering service by selecting menu options and otherwise interacting with information displayed on the cellular telephone. When a selection is made, software implemented on the telephone may be used to assist the user in transmitting appropriate data (e.g., wagering data) to the wagering service. Such data may be transmitted using any suitable technique. For example, data may be transmitted using a wireless data link that is separate from the cellular voice channels. Data may also be transmitted over the voice channel (e.g., using a modem built into the cellular telephone, by automatically generating touchtone signals that may be recognized by the interactive voice response system at transaction processing and subscription management system 24, or using any other suitable arrangement). These approaches may be used even if the user receives racing data and other information for the service using a platform other than a telephone-based platform.

Users with user television equipment 22 may interact with the service by sending data (e.g., wager data) to transaction processing and subscription management system 24 using path 44*i* or using paths 44*f* and 44*j*. Users with user computer equipment 20 may send data (e.g., wager data) to transaction processing and subscription management system 24 via path 44*h* or paths 44*d* and 44*j*. Users at any user equipment may send data for the service to locations other than transaction processing and subscription management system 24. For example, the user may provide information directly to customer service facility 36, etc.

If desired, the user may send data to the service at transaction processing and subscription management system 24 using different paths than those used to receive data from transaction processing and subscription management system 24. For example, racing data may be received at user television equipment 22 via paths 44*j* and 44*f,* whereas data may be sent by the user from user television equipment 22 to transaction processing and subscription management system 24 using path 44*i,* etc. Moreover, the paths used to receive certain video information may be different from those used to receive racing data. For example, user television equipment 22 may receive racing videos using path 44*f,* but may receive racing data using path 44*i.* These examples are merely illustrative. Any suitable combination of paths may be used to distribute racing data and other information for the interactive wagering service, any suitable combination of paths may be used to receive videos, and any suitable combination of paths may be used to send data to the wagering service.

Video production system 14 may provide program schedule information including wagering information on specific racetracks, races, and horses to be discussed on the wagering television channel to program guide data source 43 over path 44*p,* which may be, for example, a telephone modem link, an Internet-link, a wireless link, or any other suitable path. Program schedule data including schedule data for the wagering television channel and other data from program guide data source 43 may be provided to television distribution facilities 18 via path 44*q* and may be provided to transaction processing and subscription management system 24 via path 44*r*. Because therefore typically many television distribution facilities 18, it may be desirable to use a broadcast-oriented system such as a satellite data distribution system to distribute the program guide data from source 43 to television distribution facilities 18. With such a system, data may be distributed to multiple television distribution facilities 18 in parallel. Paths such as path 44*q* may involve satellite distributions or may use other links such as modem links, etc. Path 44*r* may be, for example, a modem link, an Internet link, or any other suitable path.

The program guide schedule information and wagering schedule information that is provided to television distribution facilities 18 may be distributed to user television equipment 22 over path 44*f* (e.g., with the video signal for the wagering television channel). The information may be distributed to user computer equipment 20 over path 44*d*. Such information may be distributed to user television equipment 22 and user computer equipment 20 directly from program guide data source 43 or video production system 14 or another suitable source or may be distributed to user television equipment 22 and user computer equipment 20 through other components of system 10. Program guide schedule information and wagering schedule information may be distributed to user telephone equipment 32 directly or via transaction processing and subscription management system 24 or other suitable intermediate components in system 10.

If information on the racetracks, races, and horses being discussed on the wagering television channel is not known sufficiently far in advance to provide in the form of wagering schedule data, such information may nevertheless by provided to user television equipment 22, user computer equipment 20, and user television equipment 32 in real time. This information may be distributed from video production system 14 or other suitable location in real time using paths 44*g,* 44*c,* 44*e* and 44*f,* 44*e* and 44*d,* and 44*n.* This information may also be distributed to user telephone equipment 32 in real time through intermediate components such as transaction processing and subscription management system 24.

System 10 may collect information on the activities of the user. For example, the user's equipment may be used to collect information on which television programs the user watches. Information may also be collected on how the user sets up the wagering application, the program guide, and other applications. For example, the system may collect information on which channels the user sets as favorites in the program guide. The system may also collect information on the programs for which the user sets reminders. These actions and other such actions by the user indicate an interest in certain types of programming and may be used to target wagering-related notifications and promotions to the user.

If the user interacts with other applications such as a video-on-demand application, a home shopping application, etc., information may be collected regarding the user's activities with respect to those other application.

Information on the user's actions that is gathered by the user equipment may be maintained in a local database or may be transmitted to a remote location. For example, the user's set-top box or other user television equipment 22 may gather information on which channels the user has tuned to and the durations for which these channels were tuned to. This information may be stored in memory in the set-top box or may be transmitted to a server (e.g., a server at one of television distribution facilities 18 or other suitable server or computer).

If information on the user's interests is stored locally, the interactive wagering application or any other suitable application may access this locally-stored information when presenting notifications or other promotions to the user. If information on the user's interests is stored remotely (e.g., on a server), a client-server wagering application or other suitable application may access this information when determining which notification and promotions to present to the user.

If desired, the user may interact with the wagering service using more than one platform. For example, the user may place a wager using a cellular telephone while the user is driving home. When the user arrives home, the user may determine the outcome of the wager by watching a video of the race on user television equipment. Later in the day, the user may check the user's account balance using a personal computer. This is merely an illustrative example. The various wagering platforms may be used in any suitable combination.

Although system 10 has been described in the context of a system that supports multiple wagering platforms, system 10 may support fewer platforms if desired. For example, aspects of the invention may be implemented using a system 10 that only supports cellular telephone wagering or wagering using handheld computer devices. If desired, system 10 may be configured so that it does not support personal computer wagering, wagering with standard telephones, or wagering with user television equipment. The system may support cellular telephones and/or handheld computing devices such as personal digital assistants, palm-sized computers, etc. in combination with any other suitable platform.

The interactive wagering application may be implemented using application software that runs primarily on a set-top box or other such local platform or using a remote server or other computer that is accessed from a local platform. Arrangements in which interactive wagering services are implemented using software on remote computers that is accessed on-demand from local platforms may be referred to as client-server arrangements. Such client-server arrangements may be used to allow client processes on set-top boxes to access server processes running on servers located at cable system headends or other television distribution facilities 18 (FIG. .1). Regardless of the type of system architecture or platform used, the software that supports the interactive wagering service features described herein may be referred to as an interactive wagering application.

Promotional material may be presented to the user by the interactive wagering application, an interactive program guide application, or any other suitable application. These features may be provided by a stand-alone application or may be provided by code that is incorporated into an operating system or other software. For clarity, the promotional features are described herein as being provided primarily by the interactive wagering application. This is, however, merely illustrative.

Moreover, the types of display screens that may be presented to the user are illustrated in the context of display screens provided by an interactive wagering application implemented using user television equipment 22. Such illustrative display screens may be displayed, for example, on a television connected to a set-top box. Although illustrated in this context, the display screens may be implemented using user computer equipment 20 or user telephone equipment 32 if desired. In such arrangements, the television programming that is displayed by the user computer equipment 20 or user telephone equipment 32 may be provided from any suitable source, including television distribution facilities 18, video production system 14, transaction processing and subscription management system 24, etc. For example, user computer equipment 20 may have a television tuner card that allows television programming to be displayed on a monitor or may display streaming video for a television channel on the monitor using graphics or video processing circuitry.

Figure 2:
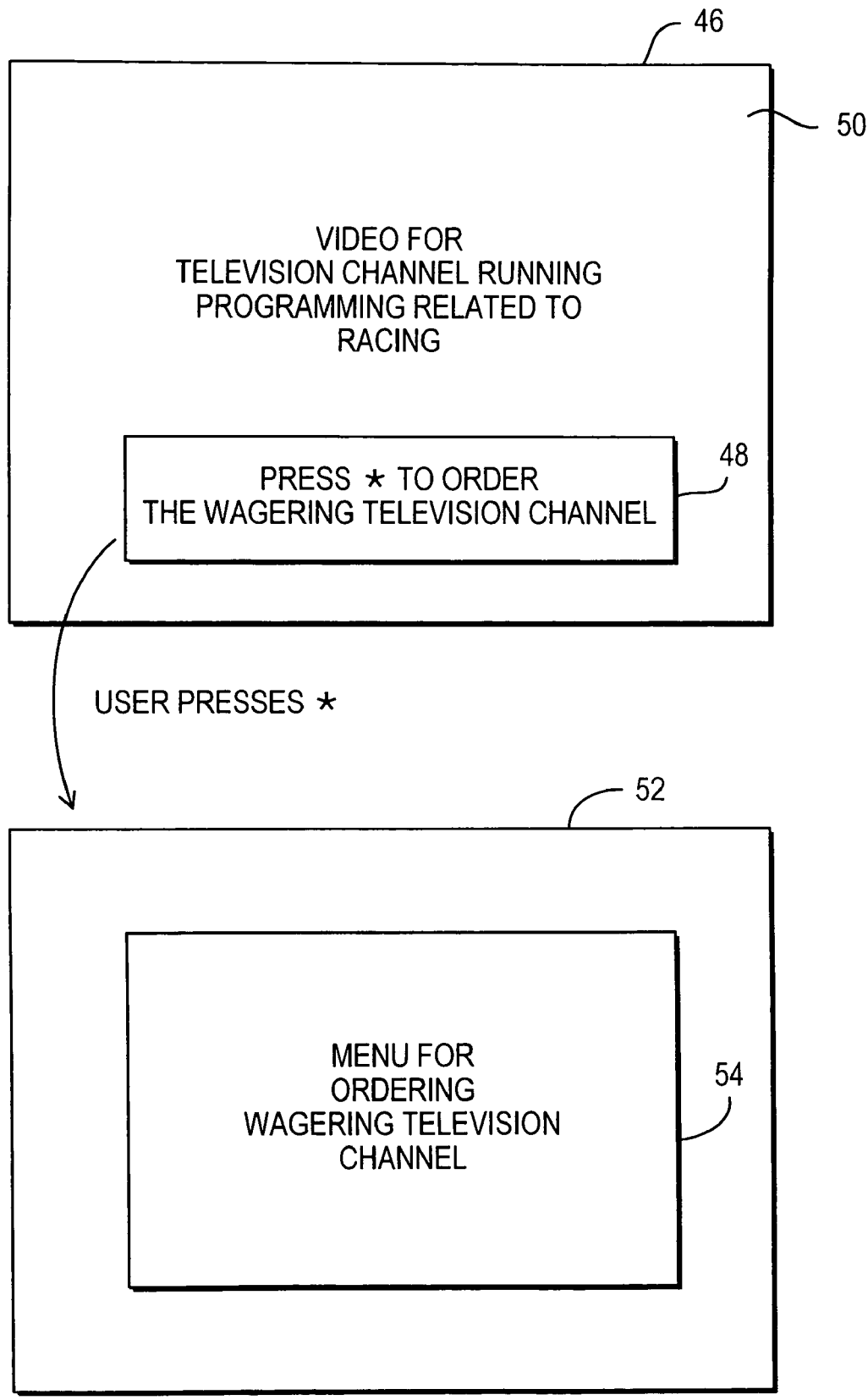
FIG. 2 shows an illustrative display screen arrangement for promoting a wagering television channel and providing an on-screen opportunity to subscribe to the wagering television channel in accordance with the present invention.

The wagering application may present the user with notifications or promotions related to wagering while the user is watching television. As shown in the illustrative display screen 46 of FIG. 2, for example, the wagering application may display a pop-up message 48 as an overlay on top of the video 50 for the current television program that the user is watching. The wagering television channel may be a premium service to which the user may subscribe. Messages such as message 48 may be used to suggest that the user press a key on the remote control to interactively order the television wagering channel.

Messages such as message 48 may be displayed when the wagering application determines that the user does not currently subscribe to the wagering television channel. Information on which television channels the user subscribes to may be provided to the wagering application by the user's service provider (e.g., the operator of the television distribution facility 18 that is associated with user television equipment 22). This information may also be stored in memory in the user television equipment 22 or other user equipment (e.g., as part of a program guide database)

If desired, message 48 may be displayed whenever the content of video 50 relates to racing. This ensures that there is a likelihood that the user is interested in the television wagering channel service being promoted by message 48. The wagering application may determine when the content of the current television channel is related to racing by analyzing the program title, genre, and description information in the program guide data that is provided to the wagering application or by using any other suitable technique. The program guide data may be maintained, for example, in a database stored in memory in the user's set-top box and may be accessed by the wagering application whenever the user watches television. Information on the current state of the tuner (indicating the channel to which the user is tuned) and information on the current time may be gathered from the set-top box.

If the user does not respond to message 48 within a predetermined time limit (e.g., a few seconds), the wagering application may remove message 48 from screen 46. If, however, the user presses the appropriate key (e.g., the * key) while message 48 is displayed, the user may be presented with a screen such as screen 52 of FIG. 2 that includes a menu 54 that provides the user with an opportunity to interactively order the wagering television channel. The menu 54 or other such options may allow the user to order services in addition to the television wagering channel. If desired, the menu 54 may contain a telephone number that the user may call to consummate the order, rather than completing the order using the remote control to interact with on-screen options.

After the user's order has been processed, the user's service provider (e.g., the cable system operator) may activate the television wagering channel service for the user. The activation process may be automated using computer equipment at the cable headend or other television distribution facility to process the order. The user may then tune to and watch the television wagering channel.

Figure 3:
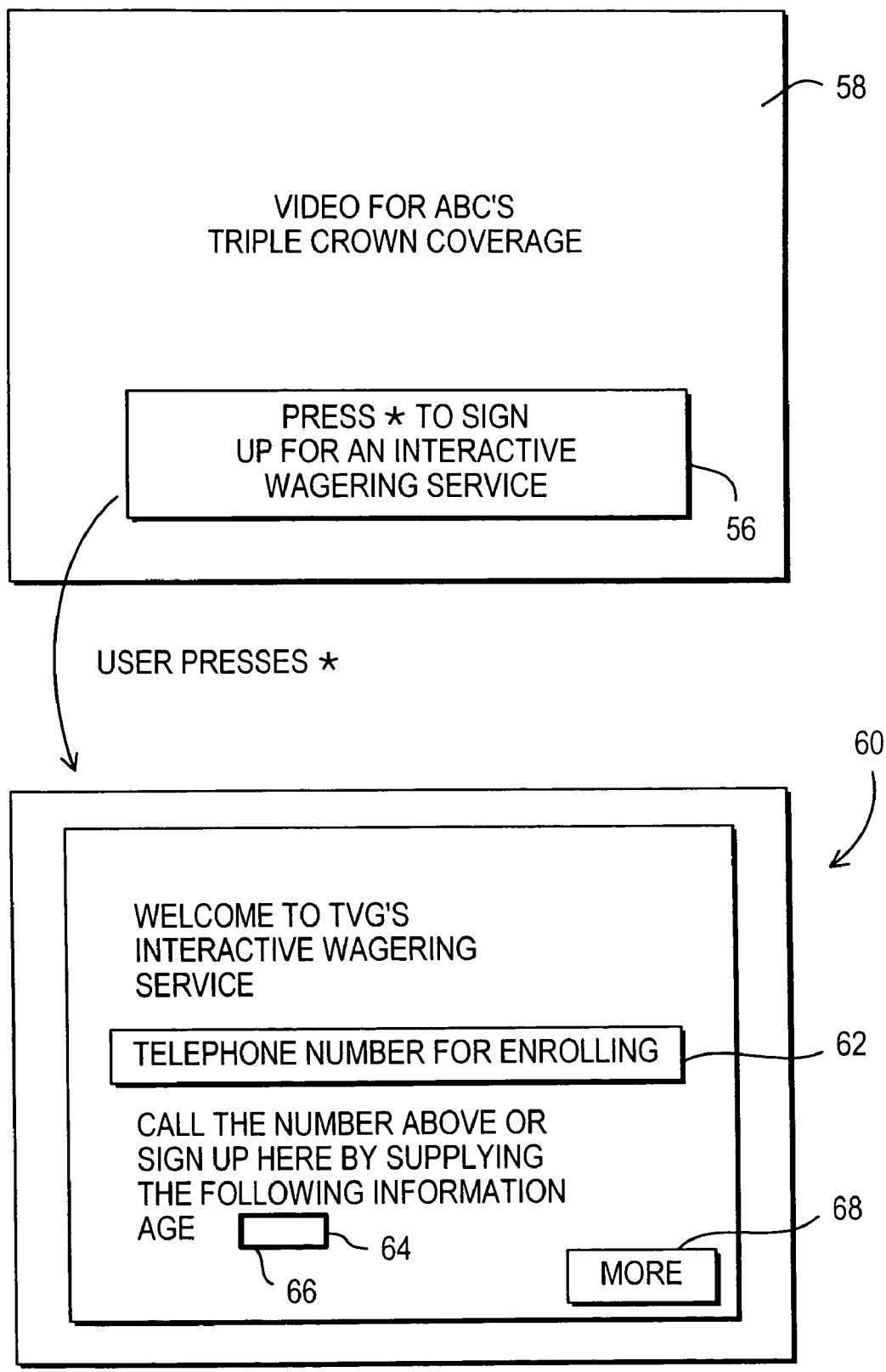
FIG. 3 shows an illustrative display screen arrangement for promoting an interactive wagering service and providing an on-screen opportunity to sign up for the interactive wagering service in accordance with the present invention.

The wagering application may also promote the interactive wagering service. As shown in FIG. 3, for example, the wagering application may display a message such as message 56 on the video 58 for the current television program being watched by the user. In the example of FIG. 3, the current television program relates to horse racing. The wagering application may wait until such programming is being displayed before displaying promotional messages such as message 56. The wagering application may determine that race-related programming is being displayed by examining the program schedule data.

Message 56 encourages the user to press a remote control key if the user is interested in signing up for the interactive wagering service. If the user presses the appropriate key, the interactive wagering application may display a sign-up screen such as screen 60 that provides the user with an opportunity to sign up for the interactive wagering service. Screen 60 may contain information 62 on a telephone number that the user may call to activate the interactive wagering service. The user may also be presented with regions such as region 64 in which to enter enrollment information. A highlight region 66 may be positioned on top of a data entry region or selectable option using remote control arrow keys. A user may select a desired option by pressing a remote control OK key. An illustrative option is more option 68. If the user selects more option 68, the wagering application may provide the user with additional screens to complete the on-screen enrollment process.

Screens such as screens 58 and 60 are merely illustrative. The interactive wagering application may use any suitable promotional messages to interest the user in signing up for the interactive wagering service when it is determined that the user is watching a racing-related program and may use any suitable on-screen data entry regions and selectable options to support on-screen enrollment if desired.

Figure 4:
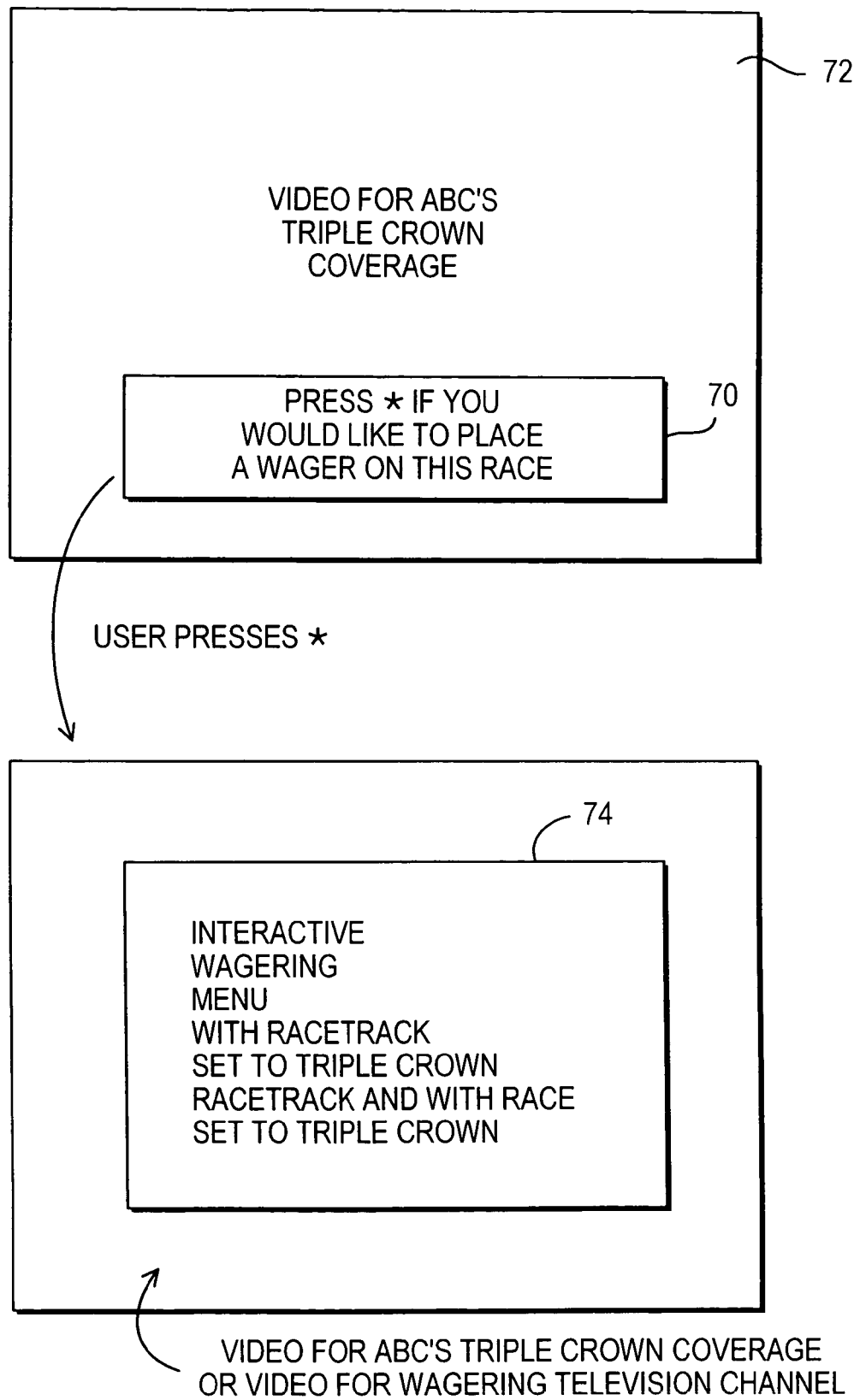
FIG. 4 shows an illustrative display screen arrangement for promoting a particular wagering opportunity and providing on-screen options that allow a user to place a corresponding wager in accordance with the present invention.

As shown in FIG. 4, a promotional message such as promotional message 70 may be displayed over the current television program 72 when it is determined that the user is watching television coverage of a race. Message 70 may be removed from the screen if the user does not respond within a few seconds. If the user presses the appropriate remote control key when message 70 is displayed, the wagering application may display an interactive wagering menu such as menu 74. Menu 74 may be displayed as an overlay on top of video for the current television channel (e.g., ABC) or the channel may be changed to the television wagering channel and menu 74 displayed as an overlay on top of the television wagering channel.

Menu 74 may provide the user with an opportunity to create a wager for submission to transaction processing and subscription management system 24 (FIG. 1). For example, menu 74 and subsequent menus linked to menu 74 may contain options that provide the user with an opportunity to specify a racetrack, race, wager type, horse or horses, and wager amount for a wager. An option may be provided that allows the user to submit the wager to transaction processing and subscription management system 24.

If a particular racetrack and race were being discussed in television program 72 when the message 70 was displayed, pressing * may direct the wagering application to supply menus to the user in which this information is already "filled in." For example, rather than provide the user with an option to select a desired racetrack, the racetrack may be preselected to match the racetrack being discussed in program 72. Similarly, information on the race being discussed in the program may be preselected when the interactive wagering application is invoked.

Information on which racetrack and race are being discussed during a particular television program may be supplied to the interactive wagering application in advance of the scheduled broadcast time for the program (e.g., as part of the program guide data for that program or in association with the program guide data for that program). Wagering information of this type may also be provided to the wagering application in real time (e.g., from a source such as the racetrack at which the race is being run, from a third party database, from the program guide database, from transaction processing and subscription management system 24, or any other suitable source).

Figure 5:
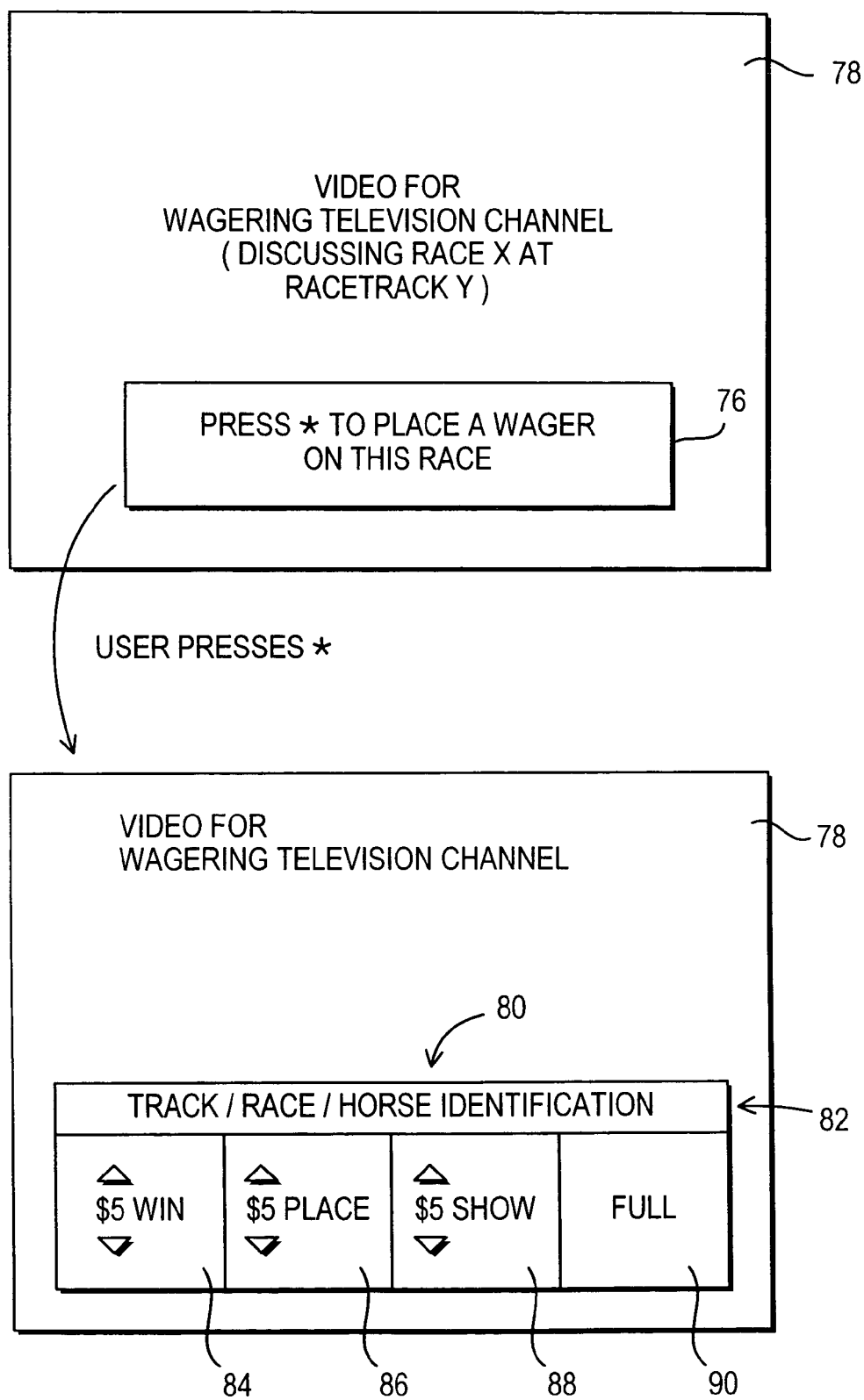
FIG. 5 shows an illustrative display screen arrangement in which an interactive wagering region is overlaid on top of a wagering television channel when the user indicates a desire to take advantage of a wagering opportunity being discussed on the wagering television channel in accordance with the present invention.

The user may be watching the television wagering channel when a promotion is displayed. This is illustrated in FIG. 5. When a racing event that is to be promoted is being discussed on the wagering television channel, a message such as message 76 may be displayed as an overlay on top of the wagering television channel programming 78. Message 76 may suggest to the user that the user press a remote control key to place a wager on the race currently being discussed. If the user does not respond to message 76 (e.g., within a few seconds), message 76 may be removed from the display.

If the user presses the appropriate key while message 76 is being displayed, the wagering application may display an interactive wagering region such as region 80 as an overlay on top of the wagering television channel 78. The top portion 82 of region 80 may be used to provide the user with a clear identification of the track, race and horse being wagered on. Selectable options such as options 84, 86, 88, and 90 may be displayed in the lower portion of region 80. Options 84, 86, and 88 allow the user to make win, place or show wagers on the identified horse. Left and right arrow keys on the remote control or other suitable user input device may be used to select a desired wager type (e.g., win, place, or show). The user can change the amount of the selected wager type by using up and down arrows on the remote control or other input device. After the user is comfortable with the settings, the user may press an OK key on the remote to submit the wager. The wager may be confirmed to the user on the display. Additional wagers can be placed, if desired. Region 80 may be removed after the user has placed the wager or by pressing a designated key on the remote control.

As shown in FIG. 5, region 80 may also include an option 90—labeled "FULL" in this example—that allows the user to call up a full-screen wagering interface. This may be desirable if the user wishes to place complicated wagers that are difficult to present on a small overlay, or if the user wants to use the robust information capabilities of the full-screen interface. When the user selects the "FULL" menu option 90, the wagering application can use the broadcast wagering information that is supplied by video production system 14

(FIG. 1) or other suitable source to preselect the currently racetrack, race, and horse being discussed. This allows the wagering application to bypass certain menus that would otherwise be provided to allow the user to select the track, race, etc. for the wager.

The options presented in region 80 may be based on data included in the broadcast wagering information (e.g., wagering information provided by video production system 14). For example, if a racetrack (rather than a horse) is featured in the broadcast, the system may first present an overlay that allows the user to select a race, and then present additional overlays to allow the user to select a horse or horses and a wager type and amount.

Region 80 may include other choices that may be of interest to the user. They may include some or all of the following choices (as well as others):

1. Handicapping information—this choice may provide handicapping data that relates to, e.g., a horse featured on the wagering-related broadcast. The data may be displayed as an overlay, or through the full interface by bypassing menus.

2. Help—this choice may provide access to context sensitive help, either as an overlay or through the full interface using menu bypassing.

3. Recording control—this choice can be used to configure the user's system to record, e.g., a race being discussed on the wagering-related broadcast.

4. Schedule—this choice can be used to obtain a schedule of upcoming broadcasts, including races, to be aired on the wagering-related broadcast channel. This option can also be configured to provide a schedule of upcoming races, whether broadcast or not.

5. Account—this choice provides the user with access to account management options, including the ability to review current balances and to transfer funds to/from a wagering account.

Some users may find region 80 to be a convenient alternative to a full wagering interface for many functions. Thus, it may be desirable to give the users access to certain wagering options in the form of such a region even in the absence of triggering broadcast wagering information. The region may be invoked, for example, by pressing a dedicated key on he remote control or other user input device. It may also be desirable to group certain menu overlay options together for ease of use. For example, different overlays could be provided for 1) wagering options, 2) information options (e.g., handicapping data, help, etc.), and 3) account management options. If desired, region 80 may be displayed as a full-screen region, rather than as an overlay.

Figure 6:
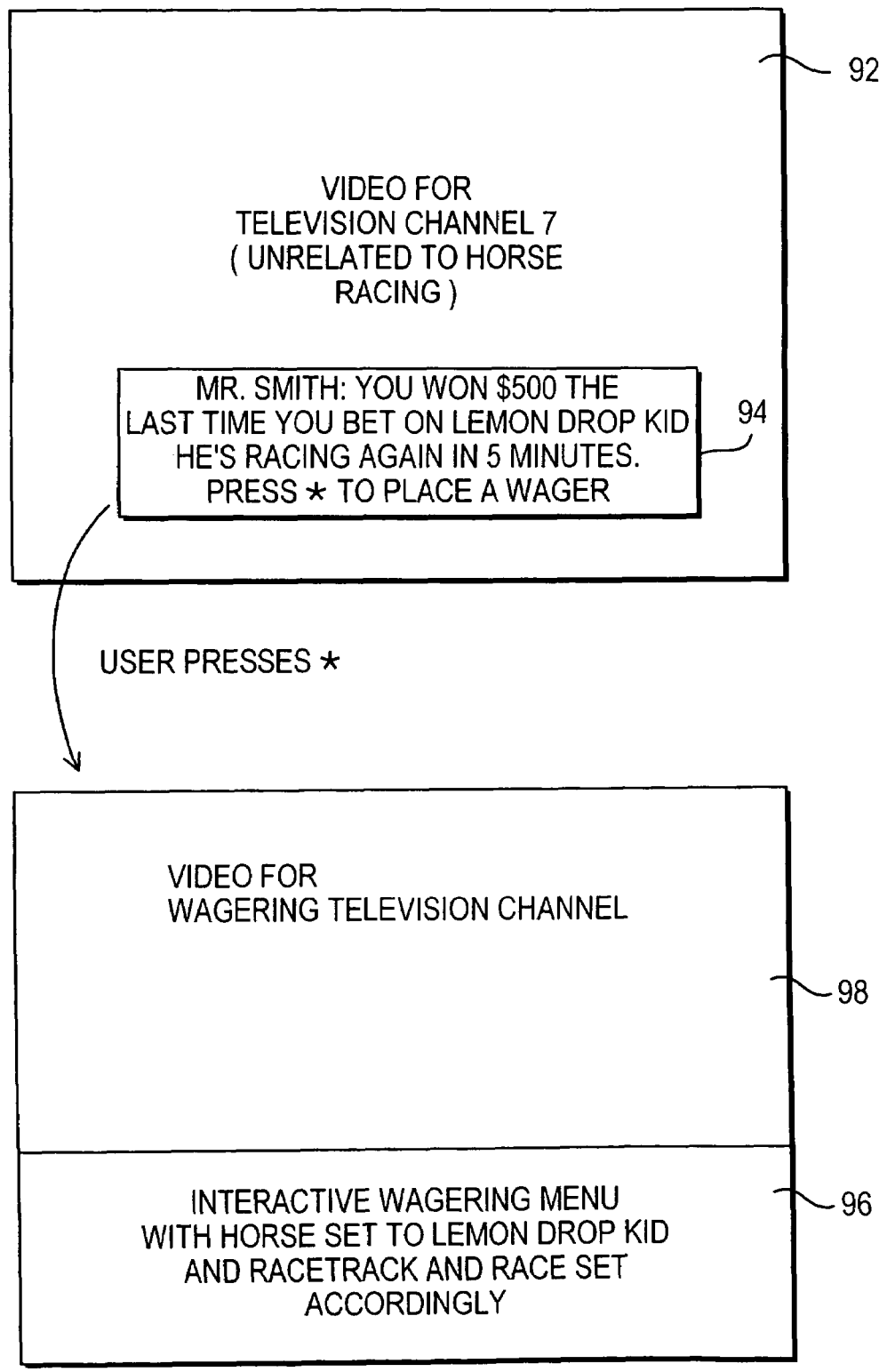
FIG. 6 shows an illustrative display screen arrangement in which a promotion is presented based on information collected about the user's past wagers in accordance with the present invention.

Another way in which users may be encouraged to use the interactive wagering application is illustrated in FIG. 6. When the user is watching a television channel 92 (even, if desired, a television channel airing programming that is currently unrelated to racing), the wagering application may display a message such as message 94. Message 94 may inform the user that the user previously won a wager placed on a particular horse. Message 94 may also inform the user that the same horse is running again in a few minutes and that the user may place a wager on the horse by pressing an appropriate remote control key. If the user does not respond within a few seconds, message 94 may be removed.

If the user presses the appropriate remote control key while message 94 is being displayed, the wagering application may display a partial-screen overlay region such as region 96 or other suitable menu of options that allows the user to interactively wager on the given horse. Regions such as region 96 may be displayed as full screen displays or as overlays. Overlays may be displayed on top of the original television channel being displayed when the user pressed the appropriate remote control key or the wagering application may automatically tune the set-top box or other equipment to the television wagering channel 98 as illustrated in FIG. 6.

Some of the wagering options in region 96 may be preselected to assist the user in placing the desired wager on the horse mentioned in message 94. For example, the racetrack at which the horse is running and the race in which the horse is running may be preselected. This allows the wagering application to bypass the track selection menu option and race selection menu option that would otherwise be provided. The wagering application may collect the information on the user's past wagers as wagers are processed and may store this information locally. Later, when the wagering application senses that the user is watching television, the wagering application may display messages such as message 94 that are based on the user's wagering interests and past wagers.

If desired, information that is collected on the user's wagering activities may be stored remotely (e.g., at a server at the television distribution facility associated with the user's equipment or at transaction processing and subscription management system 24 of FIG. 1). The wagering application may access such remote information when displaying messages to the user, so that the messages may be targeted. Messages may also be generated at a remote location and distributed to the user's equipment for display.

These approaches for determining the user's wagering interests by collecting information are merely illustrative. Any other suitable approach for determining the user's wagering interests may be used if desired.

Figure 7:
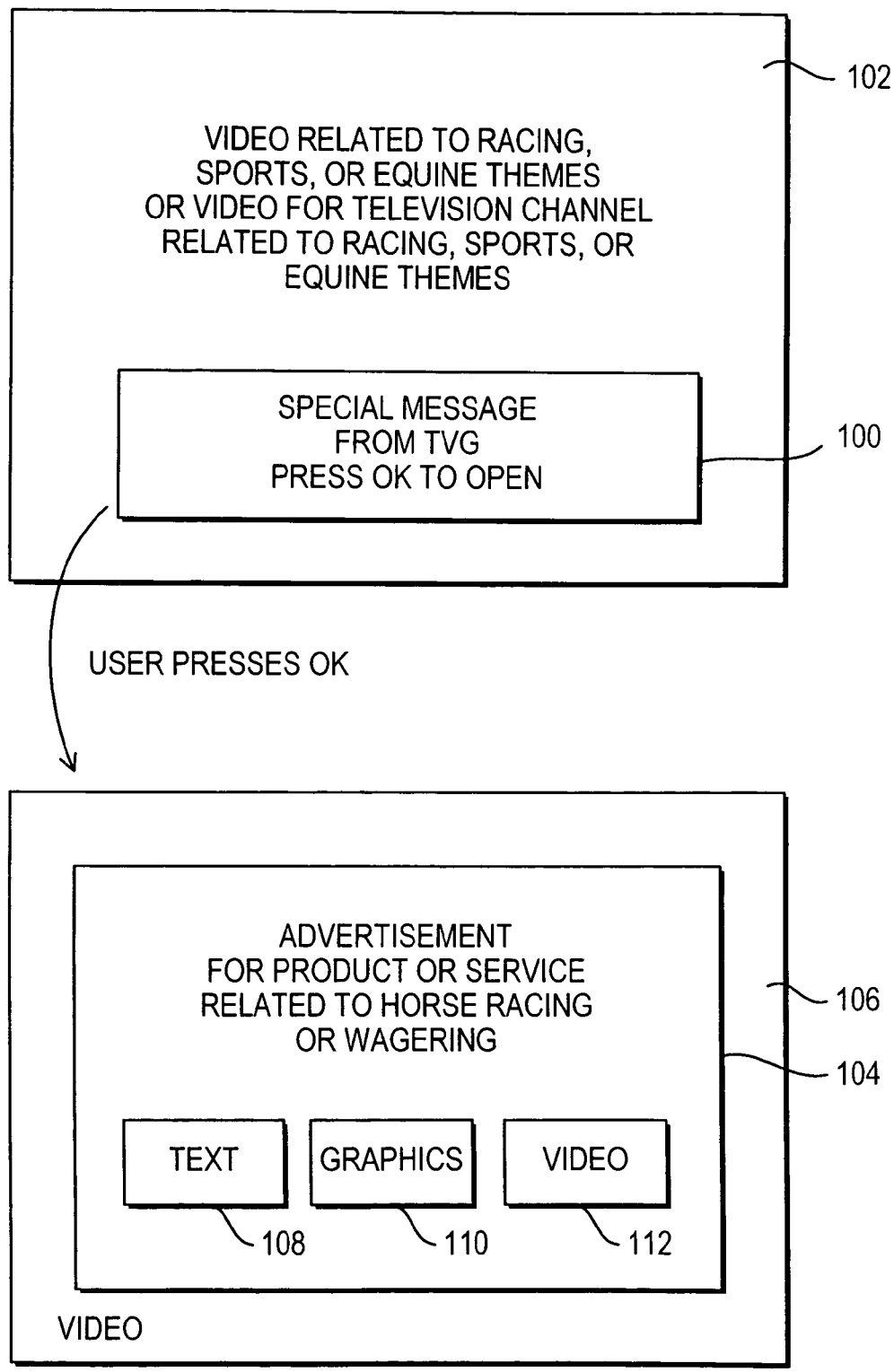
FIG. 7 shows an illustrative display screen arrangement in which promotional materials related to wagering or horse racing are displayed based on the content of a television program being watched by the user in accordance with the present invention.

The wagering application may present advertisements to users, as shown in FIG. 7. For example, the wagering application may display a message such as message 100 as an overlay on top of the video for the current television channel 102. The message 100 may be displayed when it is determined that the current programming on channel 102 is related to racing, sports, or equine themes, or that channel 102 itself is related to racing, sports, or equine themes. When the user responds to message 100 (e.g., by pressing an appropriate remote control key), the wagering application may display an advertisement such as advertisement 104.

Advertisement 104 may be displayed as an overlay on top of the current television channel 106 or other suitable channel (e.g., the television wagering channel). If desired, advertisement 104 may occupy the entire display screen. Advertisement 104 may contain text 108, graphics 110, and video 112. The content of advertisement 104 may be supplied to the wagering application using any suitable technique. For example, content may be distributed to the wagering application with program guide data, with racing data, or separately. Videos may be distributed in advance and stored locally for playback when advertisement 104 is displayed. Videos may also be distributed to the wagering application and displayed in real time.

Advertisements such as advertisement 104 may be used to promote any suitable products and services. For example, advertisement 104 may be used to promote products or services related to horse racing or wagering. Products that may be advertised include racing memorabilia (mugs, hats, tee-shirts, racing programs, etc.), books on racing, videotapes related to racing, etc. Services that may be advertised include television channels, interactive wagering services, information services (e.g., sports-related information services), video-on-demand programming related to horse racing or the like, etc.

If desired, advertisements such as advertisement 104 may be interactive. The user may press remote control buttons to select certain products for ordering. Orders may be handled by transaction processing and subscription management system 24 (FIG. 1) and merchandise fulfillment facilities 34 (FIG. 1).

Figure 8:
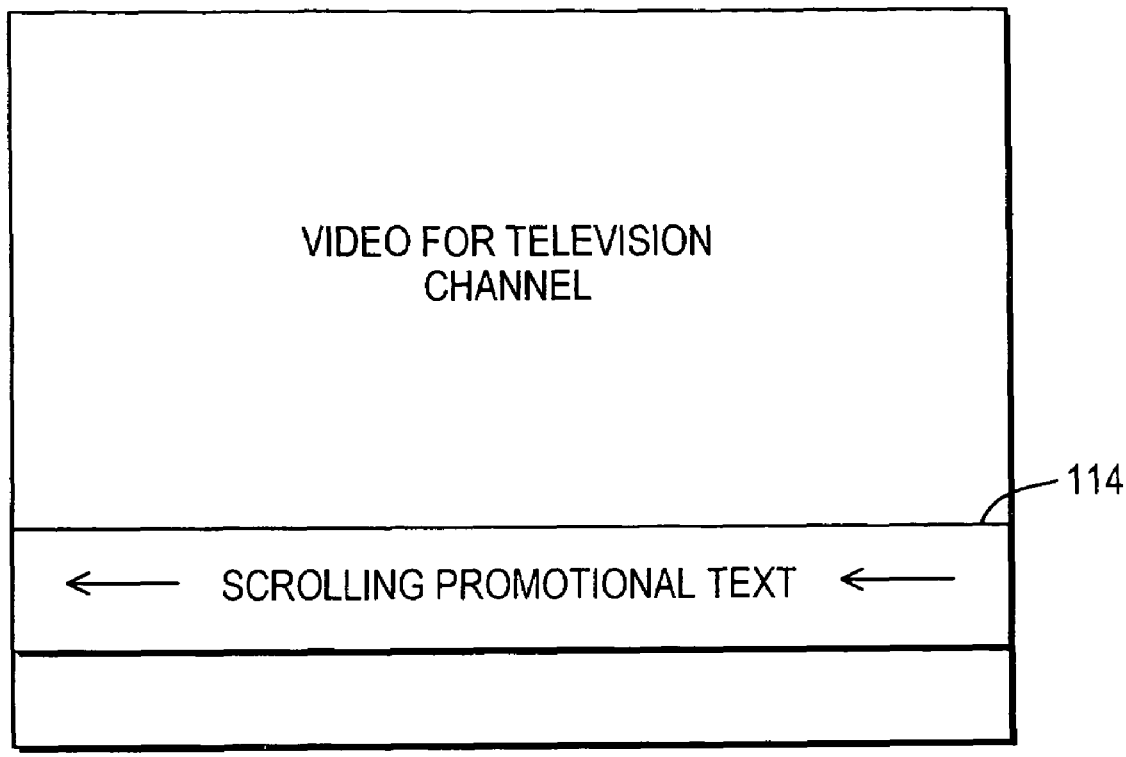
FIG. 8 shows an illustrative display screen arrangement in which a promotion is displayed in the form of scrolling text in accordance with the present invention.

As shown in FIG. 8, the wagering application may display promotional materials (e.g., messages, advertisements, notifications, or any other suitable promotional information) in the form of scrolling text promotions. Scrolling promotions such as promotion 114 may be displayed as an overlay on top of the current television channel 116. The content of promotion 114 may be related to the nature of the current television channel (e.g., the content may be horse-related, racing-related, wagering-related, or may be related to the television wagering channel, etc.) or may be related to the content of the current programming being watched by the user (e.g., horse-related, racing-related, wagering-related, etc.).

Figure 9:
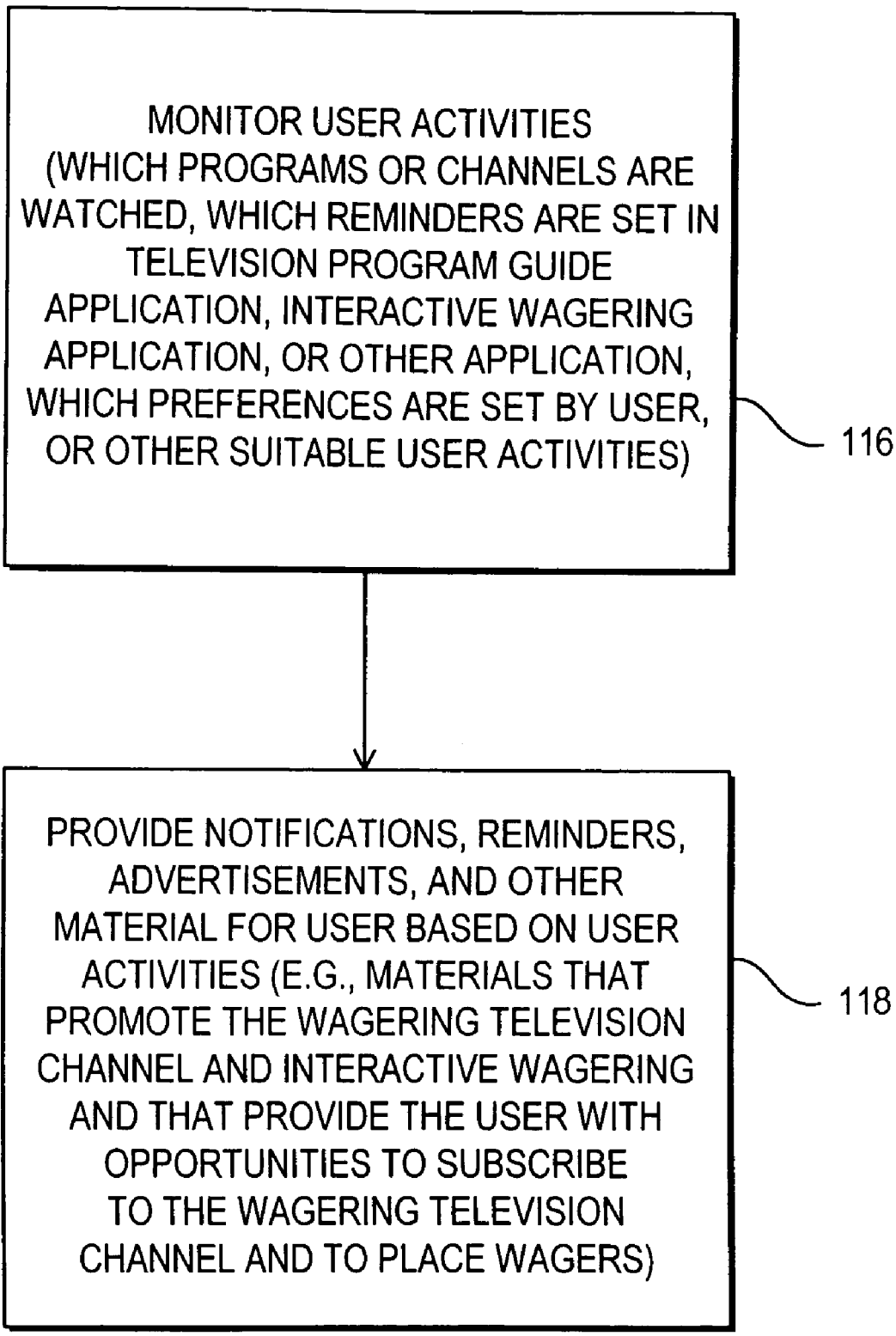
FIG. 9 is a flow chart showing illustrative steps involved monitoring user activities and presenting promotional material to users in accordance with the present invention.

Illustrative steps involved in promoting the wagering television channel or interactive wagering or the like are shown in FIG. 9. At step 116, the user's interactions with the user equipment may be monitored to determine the user's interests. For example, the user's television viewing activities may be monitored to determine whether the user is interested in racing, wagering, horses, etc. The channels that the user tunes to and the programs that the user watches may be monitored. Information on the type of content carried by a particular television channel and the type of programming being viewed at any given time by the user may be determined by analyzing program schedule data. The program schedule data may be stored locally in the user equipment and accessed periodically by the wagering application.

Information on which channels the user is tuned to and the duration that a user watches a particular channel may be ascertained by the wagering application from the state of the set-top box or other user equipment. Information may also be gathered on which settings the user establishes in the program guide, wagering application, or other applications. For example, if the user sets a sports-related channel as a favorite channel in the program guide, it may be inferred that the user is interested in sports. Information on this type of setting may be passed directly from the program guide to the wagering application or may be stored by the program guide and subsequently retrieved by the wagering application.

Settings in the wagering application may also be used to determine the user's interests. For example, if the user has set up a favorite racetrack at which to wager, this information may be used to promote wagers at that racetrack as they become available. Other user activities that may be monitored at step 116 include which wagers are placed by the user and the results of these wagers. For example, information may be collected on which horses the user most often places wagers. Information may also be collected on the wagers the user has won and loss. The wagering application or any other suitable application may perform the monitoring and information collection functions of step 116.

At step 118, the wagering application or other application may present notifications, reminders, advertisements, promotions, and other such material to the user. These materials may be displayed as an overlay on top of a television program currently being watched by the user or on top of another suitable television program. Any of these materials may also be displayed by themselves as a full-screen or partial-screen, without being displayed on top of a television program. The audio played by the user equipment may be muted when the materials are displayed or the audio may be replaced by music or a promotional message. The audio may also be the sound for the current television channel or other suitable television channel.

The materials that are displayed at step 118 may promote wagering, the wagering televison channel, the interactive wagering service, or any other suitable subject. If desired, displayed content may be targeted based on the information collected at step 116. For example, the displayed material may be a notification that is only displayed when it is determined that the content of the current television program is related to a subject that is conducive to wagering on horse races. If the current television program relates to racing (for example), the materials that are presented may be a notification message promoting the availability of an interactive horse racing wagering application.

The displayed materials may provide the user with an opportunity to subscribe to a television channel such as the wagering television channel. For example, the user may be provided with an interactive opportunity to subscribe to the channel by pressing keys on the remote control.

The materials may be interactive advertisements. When the user selects an on-screen option or otherwise responds to an interactive advertisement, the user may be provided with an opportunity to purchase a product or service.

The user may be provided with a reminder at step 118 that is based on information collected at step 116 on the user's favorite horse or other wagering preferences. For example, the wagering application may display a reminder that informs the user that a particular horse is about to run in a race. If the user responds to the reminder, the wagering application may provide the user with an opportunity to place a wager on the horse. The wagering application may present the user with a wagering menu or options in which the racetrack, race, and horse have been preselected. For example, if the user is watching television programming (e.g., television programming on the wagering television channel) in which a racetrack, race, and horse or the like are being discussed, and the user responds to a promotion or prompt (e.g., an on-screen notification that a wagering opportunity is available), wagering information on the specific wagering opportunity that is being discussed may be provided to the wagering application. The wagering application may use this information to bypass at least some of the racetrack, race, and horse selection options that would otherwise have been provided to the user and may use the information to provide the user with options and menus in which at least some of the racetrack, race, and horse selections have already been made for the user.

The foregoing is merely illustrative of the principles of this invention and various modifications can be made by those skilled in the art without departing from the scope and spirit of the invention.

What is claimed is:

1. A method for promoting an opportunity for a user at user equipment to interactively wager on races with an interactive wagering application implemented using the user equipment, comprising:

displaying television programming on the user equipment;

automatically displaying a notification as an overlay on top of the television programming that informs the user of an interactive wagering opportunity without the user requesting the notification, wherein the notification is automatically displayed in response to a determination by the wagering application that the television programming is related to wagering;

providing the user with an opportunity to respond to the notification by pressing a remote control key on a remote control; and automatically providing the user with an opportunity to electronically place a wager with the interactive wagering application in response to the pressing of the remote control key.

2. The method defined in claim 1 wherein displaying television programming comprises displaying a television channel containing programming that is not related to wagering.

3. The method defined in claim 1 wherein displaying television programming comprises displaying a wagering television channel.

4. The method defined in claim 1 wherein the notification is automatically displayed in response to a determination by the wagering application that the television programming is related to equine themes.

5. The method defined in claim 1 wherein the notification is automatically displayed in response to a determination by the wagering application that the television programming is related to sports.

6. The method defined in claim 1 wherein the notification includes a prompt asking the user to press a given remote control key to be presented with an opportunity to sign up for an interactive wagering service.

7. The method defined in claim 1 wherein the notification includes a prompt asking the user to press a given remote control key to be presented with an opportunity to subscribe to a wagering television channel.

8. The method defined in claim 1 wherein:

the notification includes a prompt asking the user to press a given remote control key to be presented with an opportunity to sign up for an interactive wagering service; and the wagering application displays on-screen enrollment options to the user when the user presses the given remote control key.

9. The method defined in claim 1 wherein:

the notification includes a prompt asking the user to press a given remote control key to be presented with an opportunity to sign up for an interactive wagering service; and the wagering application displays on-screen enrollment options to the user when the user presses the given remote control key, wherein the user may select a desired wager amount with the wager options using remote control arrow keys.

10. The method defined in claim 1 further comprising monitoring the user's activities with the user equipment.

11. The method defined in claim 1 further comprising monitoring the user's activities with the user equipment to determine which television programs the user watches.

12. The method defined in claim 1 further comprising monitoring the user's activities with the user equipment to determine which television programs the user watches, wherein content of the notification depends on which television programs the user watches.

13. The method defined in claim 1 wherein content of the notification depends on content of the television programming that is being displayed.

14. The method defined in claim 1 further comprising monitoring the user's activities with the user equipment to determine which preferences are set by the user, wherein content of the notification depends on which preferences are set.

15. The method defined in claim 1 further comprising monitoring the user's activities to determine which types of wagers the user has made with the interactive wagering application.

16. The method defined in claim 1 further comprising monitoring the user's activities to determine which types of wagers the user has made with the interactive wagering application, wherein content of the notification depends on which types of wagers the user has made.

17. The method defined in claim 1 wherein displaying television programming on the user equipment comprises displaying television programming on a television using a set-top box.

18. A method for presenting wagering related promotional materials to a user at user equipment comprising:

displaying a screen of television programming to the user with the user equipment;

monitoring the user's activities at the user equipment to determine which television programs the user watches;

displaying wagering-related promotional material on the user equipment in place of at least a portion of the screen of television programming, wherein content of the promotional material that is displayed depends on the user's activities; and providing the user with an opportunity to respond to the promotional material by pressing a remote control key on a remote control.

19. The method defined in claim 18 further comprising displaying the wagering-related promotional material as a partial-screen overlay on top of the television programming.

20. The method defined in claim 18 further comprising monitoring the user's activities to determine which television programs the user watches, wherein information on which programs are being watched is collected using program guide database information that is distributed to the user equipment from a program guide data source.

21. The method defined in claim 18 wherein displaying the television programming on the user equipment comprises displaying the television programming on a monitor using a computer.

22. The method defined in claim 18 wherein monitoring the user's activities comprises collecting information on which program guide settings the user establishes.

23. The method defined in claim 18 wherein monitoring the user's activities comprises collecting information on which interactive wagering application settings the user establishes.

24. The method defined in claim 18 wherein monitoring the user's activities comprises collecting information on which television channel the user is currently watching.

25. The method defined in claim 18 further comprising displaying the wagering-related promotional material in a scroll.

26. The method defined in claim 18 further comprising collecting information on the user's past wagers.

27. The method defined in claim 18 further comprising collecting information on which wagers the user has won.

28. The method defined in claim 18 wherein the wagering-related promotional material comprises an advertisement containing video.

29. The method defined in claim 18 wherein the wagering-related promotional material is interactive material that provides the user with an opportunity to sign up for a wagering television channel.

30. The method defined in claim 18 wherein the wagering-related promotional material is interactive material that provides the user with an opportunity to sign up for an interactive wagering service.

31. A method for presenting wagering related promotional materials to a user at a cellular telephone comprising:
  displaying television programming on a display of the cellular telephone;
  monitoring the user's activities at the cellular telephone;
  displaying wagering-related promotional material on the cellular telephone in place of at least a portion of the screen of television programming wherein content of the promotional material that is displayed depends on the user's activities; and
  providing the user with an opportunity to respond to the promotional material by pressing a remote control key on a remote control.

32. A method for presenting wagering related promotional materials to a user at user equipment comprising:
  displaying a screen of television programming to the user with the user equipment;
  monitoring the user's activities at the user equipment;
  collecting information on which wagers the user has won;
  displaying wagering-related promotional material on the user equipment in place of at least a portion of the screen of television programming wherein content of the promotional material is related to the wagers the user has won; and
  providing the user with an opportunity to respond to the promotional material by pressing a remote control key on a remote control.

33. An interactive wagering system in which a program schedule data source supplies program schedule information for television programs, comprising user television equipment that receives the program schedule information from the program schedule data source, wherein the user television equipment receives television programming that the user watches, and wherein the user television equipment is configured to:
  determine content of the television programming the user is watching using the program schedule information and information obtained from the user television equipment on a current time and a current channel to which the user television equipment is tuned; and
  display a notification to the user of the availability of an opportunity to place an interactive on-screen wager when it is determined that the television programming is related to a subject conducive to wagering.

34. A system for promoting an opportunity for a user to interactively wager on races, comprising user television equipment configured to:
  provide a display of television programming on user equipment;
  automatically provide a display of a notification on user equipment as an overlay on top of the television programming that informs the user of an interactive wagering opportunity without the user requesting the notification, wherein the display of a notification is automatically provided in response to determination by the wagering application that the television programming is related to wagering;
  provide the user with an opportunity to respond to the notification by pressing a remote control key on a remote control device; and
  automatically provide the user with an opportunity to electronically place a wager with an interactive wagering application in response to the pressing of the remote control key.

35. The system defined in claim 34 wherein the user television equipment is further configured to provide a display of a television channel containing programming that is not related to wagering.

36. The system defined in claim 34 wherein the user television equipment is further configured to provide a display of a wagering television channel.

37. The system defined in claim 34 wherein the user television equipment is further configured to automatically provide a display of a notification in response to a determination by the wagering application that the television programming is related to equine themes.

38. The system defined in claim 34 wherein the user television equipment is further configured to automatically provide a display of a notification in response to a determination by the wagering application that the television programming is related to sports.

39. The system defined in claim 34 wherein the user equipment is further configured to provide a display of a prompt asking the user to press a given remote control key to be presented with an opportunity to sign up for an interactive wagering service.

40. The system defined in claim 34 wherein the user equipment is further configured to provide a display of a notification including a prompt asking the user to press a given remote control key to be presented with an opportunity to subscribe to a wagering television channel.

41. The system defined in claim 34 wherein the user equipment is further configured to:
  provide a display of a notification including a prompt asking the user to press a given remote control key to be presented with an opportunity to sign up for an interactive wagering service; and
  provide a display of on-screen enrollment options to the user when the user presses the given remote control key.

42. The system defined in claim 34 wherein the user equipment is further configured to:
  provide a display of a notification including a prompt asking the user to press a given remote control key to be presented with an opportunity to sign up for an interactive wagering service; and
  provide a display of on-screen enrollment options to the user when the user presses the given remote control key, wherein the user may select a desired wager amount with the wager options using remote control arrow keys.

43. The system defined in claim 34 wherein the user equipment is further configured to monitor the user's activities.

44. The system defined in claim 34 wherein the user equipment is further configured to monitor the user's activities to determine which television programs the user watches.

45. The system defined in claim 34 wherein the user equipment is further configured to:
  monitor the user's activities to determine which television programs the user watches; and
  provide a display of a notification including a display of content that depends on which television programs the user watches.

46. The system defined in claim 34 wherein the user equipment is further configured to provide a display of a notification including a display of content that depends on a currently displayed television program.

47. The system defined in claim 34 wherein the user equipment is further configured to:
   monitor the user's activities to determine which preferences are set by the user; and
   provide a display of a notification including content, wherein the content of the notification depends on which preferences are set.

48. The system defined in claim 34 wherein the user equipment is further configured to monitor the user's activities to determine which types of wagers the user has made with the interactive wagering application.

49. The system defined in claim 34 wherein the user equipment is further configured to:
   monitor the user's activities to determine which types of wagers the user has made with the interactive wagering application; and
   provide a display of a notification including content, wherein the content of the notification depends on which types of wagers the user has made with the interactive wagering application.

50. The system defined in claim 34 wherein the user equipment is further configured to provide a display of television programming, wherein providing a display of television programming comprises displaying television programming on a television using a set-top box.

51. A system for presenting wagering-related promotional material to a user, comprising user equipment configured to:
   provide a display of a screen of television programming on the user equipment;
   monitor the user's activities at the user equipment to determine which television programs the user watches;
   provide a display of wagering-related promotional material, including wagering-related promotional content, on the user equipment in place of at least a portion of the screen of television programming, wherein the promotional content depends on the user's activities; and
   provide the user with an opportunity to respond to the promotional material by pressing a remote control key on a remote control.

52. The system defined in claim 51 wherein the user equipment is further configured to provide the display of promotional material as a partial-screen overlay on top of the television programming.

53. The system defined in claim 51 wherein the user equipment is further configured to collect information on which programs are being watched using program guide database information that is distributed to the user equipment from a program guide data source.

54. The system defined in claim 51 wherein the user equipment is further configured to provide a display of television programming on a monitor using a computer.

55. The system defined in claim 51 wherein the user equipment is further configured to monitor the user's activities by collecting information on which program guide settings the user establishes.

56. The system defined in claim 51 wherein the user equipment is further configured to monitor the user's activities by collecting information on which interactive wagering application settings the user establishes.

57. The system defined in claim 51 wherein the user equipment is further configured to monitor the user's activities by collecting information on which television channel the user is currently watching.

58. The system defined in claim 51 wherein the user equipment is further configured to display the wagering-related promotional material in a scroll.

59. The system defined in claim 51 wherein the user equipment is further configured to collect information on the user's past wagers.

60. The system defined in claim 51 wherein the user equipment is further configured to collect information on which wagers the user has won.

61. The system defined in claim 51 wherein the wagering-related promotional material comprises an advertisement containing video.

62. The system defined in claim 51 wherein the wagering-related promotional material is interactive material that provides the user with an opportunity to sign up for a wagering television channel.

63. The system defined in claim 51 wherein the wagering-related promotional material is interactive material that provides the user with an opportunity to sign up for an interactive wagering service.

64. A system for presenting wagering-related related promotional material to a user comprising cellular telephone configured to:
   display television programming on the display of the cellular telephone;
   monitor the user's activities at the cellular telephone;
   provide a display of wagering-related promotional material on the cellular telephone in place of at least a portion of the screen of television programming wherein content of the promotional material that is displayed depends on the user's activities; and
   provide the user with an opportunity to respond to the promotional material by pressing a remote control key on a remote control.

65. A system for presenting wagering-related promotional material to a user comprising user equipment configured to:
   provide a display of a screen of television programming to the user;
   monitor the user's activities at the user equipment;
   collect information on which wagers the user has won;
   provide a display of wagering-related promotional material on the user equipment in place of at least a portion of the screen of television programming wherein content of the promotional material that is displayed depends on the user's activities and is related to the wagers the user has won; and
   provide the user with an opportunity to respond to the promotional material by pressing a remote control key on a remote control.

66. A machine readable medium comprising machine program logic recorded thereon for:
   providing a display of television programming on user equipment;
   automatically providing a display of a notification on the user equipment as an overlay on top of the television programming that informs the user of an interactive wagering opportunity without the user requesting the notification, wherein the notification is displayed in response to a determination by the wagering application that the television programming is related to wagering;
   providing the user with an opportunity to respond to the notification by pressing a remote control key on a remote control device; and automatically providing the user with an opportunity to electronically place a wager with an interactive wagering application in response to the pressing of the remote control key.

67. The machine readable medium of claim 66 further comprising machine program logic recorded thereon for providing a display of a television channel containing programming that is not related to wagering.

68. The machine readable medium of claim 66 further comprising machine program logic recorded thereon for providing a display of a wagering television channel.

69. The machine readable medium of claim 66 further comprising machine program logic recorded thereon for automatically providing a display of a notification in response to a determination by the wagering application that the television programming is related to equine themes.

70. The machine readable medium of claim 66 further comprising machine program logic recorded thereon for automatically providing a display of a notification in response to a determination by the wagering application that the television programming is related to sports.

71. The machine readable medium of claim 66 further comprising machine program logic recorded thereon for providing a display of a prompt asking the user to press a given remote control key to be presented with an opportunity to sign up for an interactive wagering service.

72. The machine readable medium of claim 66 further comprising machine program logic recorded thereon for providing a display of a notification including a prompt asking the user to press a given remote control key to be presented with an opportunity to subscribe to a wagering television channel.

73. The machine readable medium of claim 66 further comprising machine program logic recorded thereon for:
    providing a display of a notification including a prompt asking the user to press a given remote control key to be presented with an opportunity to sign up for an interactive wagering service; and
    providing a display of on-screen enrollment options to the user when the user presses the given remote control key.

74. The machine readable medium of claim 66 further comprising machine program logic recorded thereon for:
    providing a display of a notification including a prompt asking the user to press a given remote control key to be presented with an opportunity to sign up for an interactive wagering service; and
    providing a display of on-screen enrollment options to the user when the user presses the given remote control key, wherein the user may select a desired wager amount with the wager options using remote control arrow keys.

75. The machine readable medium of claim 66 further comprising machine program logic recorded thereon for monitoring the user's activities.

76. The machine readable medium of claim 66 further comprising machine program logic recorded thereon for monitoring the user's activities to determine which television programs the user watches.

77. The machine readable medium of claim 66 further comprising machine program logic recorded thereon for monitoring the user's activities to determine which television programs the user watches, wherein the display of a notification includes providing a display of content that depends on which television programs the user watches.

78. The machine readable medium of claim 66 further comprising machine program logic recorded thereon for providing a display of a notification including a display of content that depends on a currently displayed television program.

79. The machine readable medium of claim 66 further comprising machine program logic recorded thereon for:
    monitoring the user's activities to determine which preferences are set by the user; and
    providing a display of a notification including content, wherein the content of the notification depends on which preferences are set.

80. The machine readable medium of claim 66 further comprising machine program logic recorded thereon for monitoring the user's activities to determine which types of wagers the user has made with the interactive wagering application.

81. The machine readable medium of claim 66 further comprising machine program logic recorded thereon for:
    monitoring the user's activities to determine which types of wagers the user has made with the interactive wagering application; and
    providing a display of a notification including content, wherein the content of the notification depends on which types of wagers the user has made with the interactive wagering application.

82. The machine readable medium of claim 66 further comprising machine program logic recorded thereon for providing a display of television programming comprising displaying television programming on a television using a set-top box.

83. A machine readable medium comprising machine program logic recorded thereon for:
    providing a display of a screen of television programming on the user equipment;
    monitoring the user's activities at the user equipment to determine which television programs the user watches;
    providing a display of wagering-related promotional material, including wagering-related promotional content, on the user equipment in place of at least a portion of the screen of television programming, wherein the promotional content depends on the user's activities; and
    providing the user with an opportunity to respond to the promotional material by pressing a remote control key on a remote control.

84. The machine readable medium of claim 83 further comprising machine program logic recorded thereon for providing the display of promotional material as a partial-screen overlay on top of the television programming.

85. The machine readable medium of claim 83 further comprising machine program logic recorded thereon for collecting information on which programs are being watched using program guide database information that is distributed to the user equipment from a program guide data source.

86. The machine readable medium of claim 83 further comprising machine program logic recorded thereon for providing a display of television programming on a monitor using a computer.

87. The machine readable medium of claim 83 further comprising machine program logic recorded thereon for monitoring the user's activities by collecting information on which program guide settings the user establishes.

88. The machine readable medium of claim 83 further comprising machine program logic recorded thereon for monitoring the user's activities by collecting information on which interactive wagering application settings the user establishes.

89. The machine readable medium of claim 83 further comprising machine program logic recorded thereon for monitoring the user's activities by collecting information on which television channel the user is currently watching.

90. The machine readable medium of claim 83 further comprising machine program logic recorded thereon for displaying the wagering-related promotional material in a scroll.

91. The machine readable medium of claim 83 further comprising machine program logic recorded thereon for collecting information on the user's past wagers.

92. The machine readable medium of claim 83 further comprising machine program logic recorded thereon for collecting information on which wagers the user has won.

93. The machine readable medium of claim 83 further comprising machine program logic recorded thereon for providing a display of wagering-related promotional material comprising an advertisement containing video.

94. The machine readable medium of claim 83 further comprising machine program logic recorded thereon for providing a display of wagering-related promotional material that is interactive material that provides the user with an opportunity to sign up for a wagering television channel.

95. The machine readable medium of claim 83 further comprising machine program logic recorded thereon for providing a display of wagering-related promotional material that is interactive material that provides the user with an opportunity to sign up for an interactive wagering service.

96. A machine readable medium comprising machine program logic recorded thereon for:
   providing a display of television programming on a display of user equipment, wherein the user equipment comprises a cellular telephone;
   monitoring the user's activities at the user equipment;
   providing a display of wagering-related promotional material on the user equipment in place of at least a portion of the screen of television programming wherein content of the promotional material that is displayed depends on the user's activities; and
   providing the user with an opportunity to respond to the promotional material by pressing a remote control key on a remote control.

97. A machine readable medium comprising machine program logic recorded thereon for:
   displaying a screen of television programming to the user with the user equipment;
   monitoring the user's activities at the user equipment;
   collecting information on which wagers the user has won;
   displaying wagering-related promotional material on the user equipment in place of at least a portion of the screen of television programming wherein content of the promotional material that is displayed depends on the user's activities and is related to the wagers the user has won; and
   providing the user with an opportunity to respond to the promotional material by pressing a remote control key on a remote control.

98. A method for providing an opportunity for a user at user equipment to interactively wager on races with an interactive wagering application implemented using the user equipment, comprising:
   receiving program schedule information for television programs from a program schedule data source;
   determining content of the television programming the user is watching using the program schedule information and information obtained from the user television equipment on a current time and a current channel to which the user equipment is tuned; and
   providing a display of a notification to the user indicating the availability of an opportunity to place an interactive on-screen wager when it is determined that the television programming is related to a subject conducive to wagering.

99. A machine readable medium comprising machine program logic recorded thereon for:
   receiving program schedule information for television programs from a program schedule data source;
   determining content of the television programming the user is watching using the program schedule information and information obtained from the user television equipment on a current time and a current channel to which the user equipment is tuned; and
   providing a display of a notification to the user indicating the availability of an opportunity to place an interactive on-screen wager when it is determined that the television programming is related to a subject conducive to wagering.

* * * * *